US009735933B2

United States Patent
Park et al.

(10) Patent No.: US 9,735,933 B2
(45) Date of Patent: Aug. 15, 2017

(54) METHOD FOR RECEIVING OR TRANSMITTING DOWNLINK SIGNAL IN WIRELESS COMMUNICATION SYSTEM AND DEVICE THEREFOR

(71) Applicant: LG ELECTRONICS INC., Seoul (KR)

(72) Inventors: Jonghyun Park, Anyang-si (KR); Eunsun Kim, Anyang-si (KR); Hanbyul Seo, Anyang-si (KR); Kijun Kim, Anyang-si (KR); Byounghoon Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 262 days.

(21) Appl. No.: 14/411,568

(22) PCT Filed: Jul. 9, 2013

(86) PCT No.: PCT/KR2013/006088
§ 371 (c)(1),
(2) Date: Dec. 29, 2014

(87) PCT Pub. No.: WO2014/010911
PCT Pub. Date: Jan. 16, 2014

(65) Prior Publication Data
US 2015/0180625 A1 Jun. 25, 2015

Related U.S. Application Data

(60) Provisional application No. 61/669,655, filed on Jul. 9, 2012, provisional application No. 61/674,850, filed
(Continued)

(51) Int. Cl.
*H04L 5/00* (2006.01)
*H04W 72/04* (2009.01)
(Continued)

(52) U.S. Cl.
CPC ......... *H04L 5/0035* (2013.01); *H04B 7/024* (2013.01); *H04L 5/0051* (2013.01); *H04W 72/04* (2013.01);
(Continued)

(58) Field of Classification Search
CPC ..... H04L 5/0035; H04L 5/0051; H04B 7/024; H04W 72/04; H04W 72/042; H04W 88/02; H04W 88/08
(Continued)

(56) References Cited

U.S. PATENT DOCUMENTS

| | | | | |
|---|---|---|---|---|
| 2013/0258964 A1* | 10/2013 | Nam | ............... | H04W 72/046 370/329 |
| 2013/0301542 A1* | 11/2013 | Krishnamurthy | ..... | H04W 52/50 370/329 |
| 2014/0056270 A1* | 2/2014 | Ahmadi | ............. | H04L 12/5692 370/329 |

FOREIGN PATENT DOCUMENTS

| | | |
|---|---|---|
| KR | 10-2010-0117522 | 11/2010 |
| KR | 10-2012-0002537 | 1/2012 |
| KR | 10-2012-0016678 | 2/2012 |

OTHER PUBLICATIONS

Ericsson, "Draft LS response on reference scenarios for antenna ports co-location," 3GPP TSG-RAN1 Meeting #69, R1-122540, May 2012, 2 pages.
(Continued)

*Primary Examiner* — Obaidul Huq
(74) *Attorney, Agent, or Firm* — Lee Hong Degerman Kang Waimey

(57) ABSTRACT

One embodiment of the present invention discloses a method for receiving a downlink signal in a wireless communication system that supports coordinated multiple-point transmission and reception (CoMP), and the method comprises the steps of: receiving downlink control information
(Continued)

that contains a plurality of resource allocation parts from a base station; and acquiring information on whether it can be assumed that an antenna port(s) of a particular reference signal and an antenna port (s) of a demodulation reference signal associated with each of the plurality of resource allocation parts are quasi co-located (QCL).

16 Claims, 13 Drawing Sheets

Related U.S. Application Data on Jul. 23, 2012, provisional application No. 61/682,194, filed on Aug. 10, 2012.

(51) Int. Cl.
*H04B 7/024* (2017.01)
*H04W 88/02* (2009.01)
*H04W 88/08* (2009.01)

(52) U.S. Cl.
CPC .......... *H04W 72/042* (2013.01); *H04W 88/02* (2013.01); *H04W 88/08* (2013.01)

(58) Field of Classification Search
USPC ........................................ 370/310, 328, 329
See application file for complete search history.

(56) References Cited

OTHER PUBLICATIONS

Ericsson, "LS response on antenna ports co-location," 3GPP TSG-RAN1 Meeting #68bis, R1-121919, Mar. 2012, 2 pages.
PCT International Application No. PCT/KR2013/006088, Written Opinion of the International Searching Authority dated Oct. 24, 2013, 20 pages.

\* cited by examiner

FIG. 5
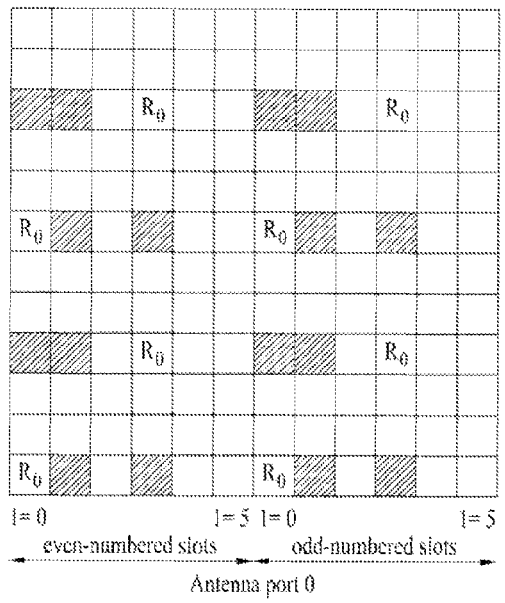
Antenna port 0
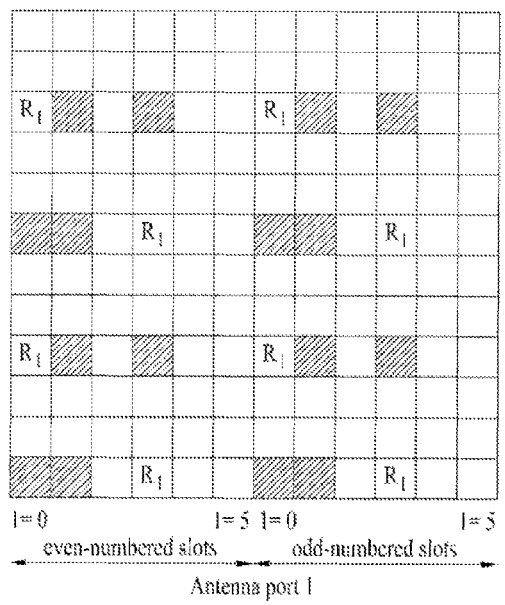
Antenna port 1
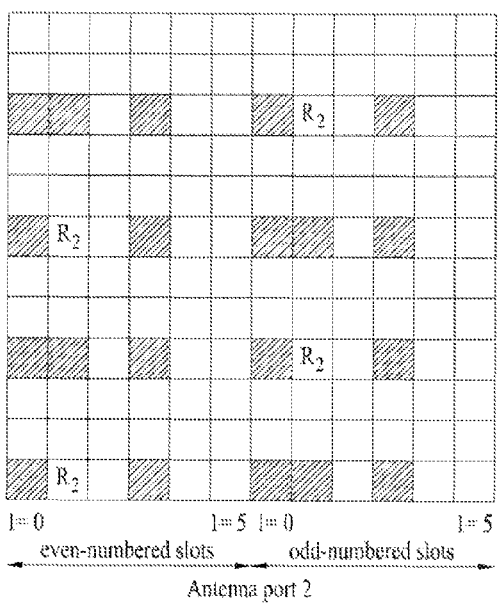
Antenna port 2
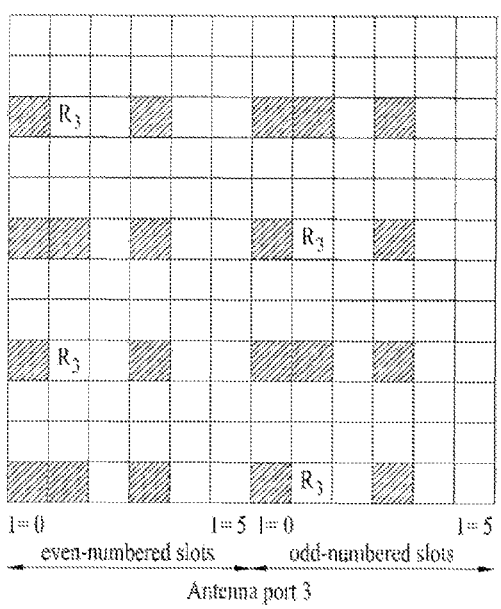
Antenna port 3
$R_0$ : CRS for antenna port 0    $R_2$ : CRS for antenna port 2
$R_1$ : CRS for antenna port 1    $R_3$ : CRS for antenna port 3

FIG. 6
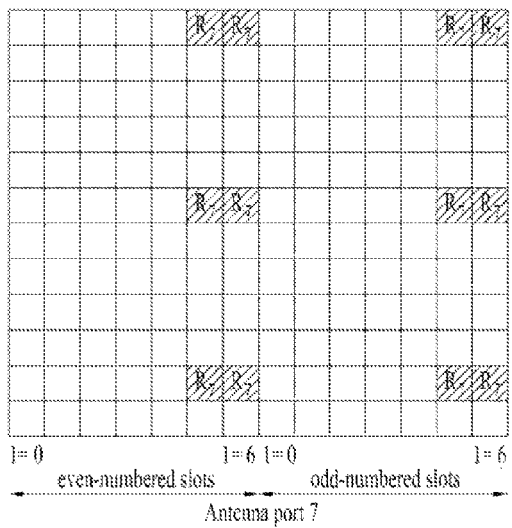
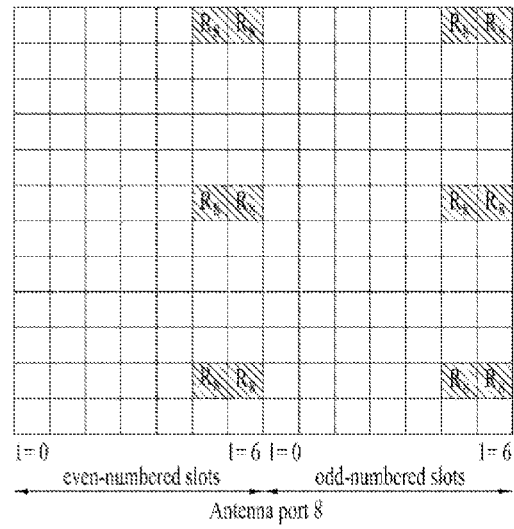
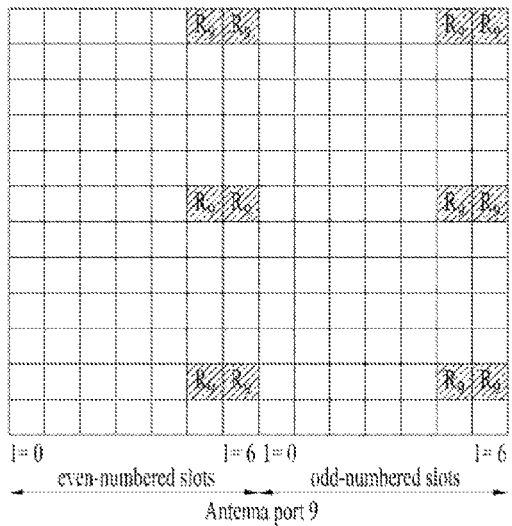
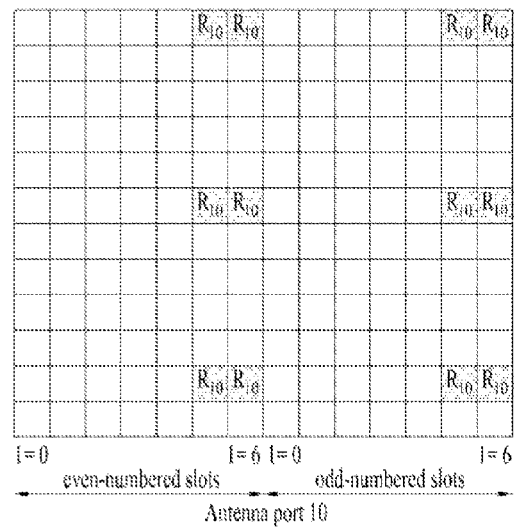

FIG. 11

○ TYPE 1 (BITMAP, LVRB ONLY)
- BITMAP INDICATES RBS FROM ONE SET AMONG SUBSETS OF P RBGS
- PART OF BITMAP IN SELECTED RBG SUBSET (SHIFT VALUE) IS DETERMINED ACCORDING TO FOLLOWING EQUATION $$N_{RB}^{TYPE1} = \lceil N_{RB}^{DL}/P \rceil - \lceil \log_2(P) \rceil - 1$$   e.g. P=3, $N_{RB\_DL}$=32, bitmap for $N_{RB\_TYPE1}$ = 11-2-1 = 8 bits

| RBG size (P) | System Bandwidth |
|---|---|
| 1 | <10 |
| 2 | 11-26 |
| 3 | 27-63 |
| 4 | 64-110 |

<GENERAL RULE FOR RBG SUBSET>
- $N_{RB}$ IS NUMBER OF PRBS IN SYSTEM
- P IS NUMBER OF RBS IN RBG
- RBGS ARE DISTRIBUTED IN P SUBSETS

METHOD FOR RECEIVING OR TRANSMITTING DOWNLINK SIGNAL IN WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2013/006088, filed on Jul. 9, 2013, which claims the benefit of U.S. Provisional Application Ser. No. 61/669,655, filed on Jul. 9, 2012, 61/674,850, filed on Jul. 23, 2012, and 61/682,194, filed on Aug. 10, 2012, the contents of which are all hereby incorporated by reference herein in their entirety.

TECHNICAL FIELD

The present invention relates to a wireless communication system, and more particularly, to a method and apparatus for receiving or transmitting a downlink signal in a wireless communication system.

BACKGROUND ART

Recently, various devices requiring machine-to-machine (M2M) communication and high data transfer rate, such as smartphones or tablet personal computers (PCs), have appeared and come into widespread use. This has rapidly increased the quantity of data which needs to be processed in a cellular network. In order to satisfy such rapidly increasing data throughput, recently, carrier aggregation (CA) technology which efficiently uses more frequency bands, cognitive ratio technology, multiple antenna (MIMO) technology for increasing data capacity in a restricted frequency, multiple-base-station cooperative technology, etc. have been highlighted. In addition, communication environments have evolved such that the density of accessible nodes is increased in the vicinity of a user equipment (UE). Here, the node includes one or more antennas and refers to a fixed point capable of transmitting/receiving radio frequency (RF) signals to/from the user equipment (UE). A communication system including high-density nodes may provide a communication service of higher performance to the UE by cooperation between nodes.

A multi-node coordinated communication scheme in which a plurality of nodes communicates with a user equipment (UE) using the same time-frequency resources has much higher data throughput than legacy communication scheme in which each node operates as an independent base station (BS) to communicate with the UE without cooperation.

A multi-node system performs coordinated communication using a plurality of nodes, each of which operates as a base station or an access point, an antenna, an antenna group, a remote radio head (RRH), and a remote radio unit (RRU). Unlike the conventional centralized antenna system in which antennas are concentrated at a base station (BS), nodes are spaced apart from each other by a predetermined distance or more in the multi-node system. The nodes can be managed by one or more base stations or base station controllers which control operations of the nodes or schedule data transmitted/received through the nodes. Each node is connected to a base station or a base station controller which manages the node through a cable or a dedicated line.

The multi-node system can be considered as a kind of Multiple Input Multiple Output (MIMO) system since dispersed nodes can communicate with a single UE or multiple UEs by simultaneously transmitting/receiving different data streams. However, since the multi-node system transmits signals using the dispersed nodes, a transmission area covered by each antenna is reduced compared to antennas included in the conventional centralized antenna system. Accordingly, transmit power required for each antenna to transmit a signal in the multi-node system can be reduced compared to the conventional centralized antenna system using MIMO. In addition, a transmission distance between an antenna and a UE is reduced to decrease in pathloss and enable rapid data transmission in the multi-node system. This can improve transmission capacity and power efficiency of a cellular system and meet communication performance having relatively uniform quality regardless of UE locations in a cell. Further, the multi-node system reduces signal loss generated during transmission since base station(s) or base station controller(s) connected to a plurality of nodes transmit/receive data in cooperation with each other. When nodes spaced apart by over a predetermined distance perform coordinated communication with a UE, correlation and interference between antennas are reduced. Therefore, a high signal to interference-plus-noise ratio (SINR) can be obtained according to the multi-node coordinated communication scheme.

Owing to the above-mentioned advantages of the multi-node system, the multi-node system is used with or replaces the conventional centralized antenna system to become a new foundation of cellular communication in order to reduce base station cost and backhaul network maintenance cost while extending service coverage and improving channel capacity and SINR in next-generation mobile communication systems.

DISCLOSURE

Technical Problem

An object of the present invention devised to solve the problem lies in a method for receiving or transmitting downlink control information including a plurality of resource allocation parts in a wireless communication system.

Another object of the present invention devised to solve the problem lies in a method for indicating that specific antenna ports can be assumed to be quasi co-located (QCL) with respect to the resource allocation parts.

Another object of the present invention devised to solve the problem lies in a method for indicating information about resource mapping that considers a specific antenna port in together with the QCL assumption with respect to the resource allocation parts.

It is to be understood that both the foregoing general description and the following detailed description of the present invention are exemplary and explanatory and are intended to provide further explanation of the invention as claimed.

Technical Solution

The object of the present invention can be achieved by providing a method for receiving downlink signal in a wireless communication system for supporting coordinated multiple-point transmission and reception (CoMP), the method including receiving downlink control information including a plurality of resource allocation parts from a base station (BS), and acquiring information on whether or not quasi co-located (QCL) assumption between antenna port(s) of a specific reference signal and antenna port (s) of demodulation reference signals associated with each of the plurality of resource allocation parts is applied.

Preferably, whether or not the QCL assumption may be indicated dynamically through a specific field of each of the plurality of resource allocation parts semi-statically via higher layer signaling.

Preferably, each of the plurality of resource allocation parts may include demodulation reference signal configuration information including information about antenna port(s), a scrambling identifier and the number of layers for a corresponding demodulation reference signal.

Preferably, the downlink control information may include demodulation reference signal configuration information including information about antenna port(s), a scrambling identifier and the number of layers for a demodulation reference signal shared by the plurality of resource allocation parts.

Preferably, resources scheduled by the plurality of resource allocation parts may be transmitted by at least two BSs.

Preferably, the method may further include acquiring information about resource mapping of a downlink data channel with consideration for antenna port(s) of the specific reference signal to which the QCL assumption is applied.

Preferably, the information about resource mapping of the downlink data channel may be indicated in association with the information on whether or not the QCL assumption is applied.

In another aspect of the present invention, provided herein is a method for transmitting a downlink signal in a wireless communication system for supporting coordinated multiple-point transmission and reception (CoMP), the method including transmitting downlink control information including a plurality of resource allocation parts to a user equipment (UE), wherein the transmitting includes transmitting information on whether or not quasi co-located (QCL) assumption between antenna port(s) of a specific reference signal and antenna port (s) of demodulation reference signals associated with each of the plurality of resource allocation parts is applied.

Preferably, whether or not the QCL assumption is applied may be indicated dynamically through a specific field of each of the resource allocation parts or semi-statically via higher layer signaling.

Preferably, each of the plurality of resource allocation parts may include demodulation reference signal configuration information including information about antenna port(s), a scrambling identifier and the number of layers for a corresponding demodulation reference signal.

Preferably, the downlink control information may include demodulation reference signal configuration information including information about antenna port(s), a scrambling identifier and the number of layers for a demodulation reference signal shared by the plurality of resource allocation parts.

Preferably, resources scheduled by the plurality of resource allocation parts may be transmitted by at least two BSs.

Preferably, the method may further include transmitting information about resource mapping of a downlink data channel with consideration for antenna port(s) of the specific reference signal to which the QCL assumption is applied.

Preferably, the information about resource mapping of the downlink data channel may be indicated in association with the information on whether or not the QCL assumption is applied.

In another aspect of the present invention, provided herein is a user equipment (UE) configured to receive a downlink signal in a wireless communication system for supporting coordinated multiple-point transmission and reception (CoMP), the UE including a radio frequency (RF) unit, and a processor configured to control the RF unit, wherein the processor is configured to receive downlink control information including a plurality of resource allocation parts from a base station (BS), and to acquire information on whether or not quasi co-located (QCL) assumption between antenna port(s) of a specific reference signal and antenna port (s) of demodulation reference signals associated with each of the plurality of resource allocation parts is applied.

In another aspect of the present invention, provided herein is a base station (BS) configured to receive a downlink signal in a wireless communication system for supporting coordinated multiple-point transmission and reception (CoMP), the BS including a radio frequency (RF) unit, and a processor configured to control the RF unit, wherein the processor is configured to transmit downlink control information including a plurality of resource allocation parts to a user equipment (UE), and to transmit information on whether or not quasi co-located (QCL) assumption between antenna port(s) of a specific reference signal and antenna port (s) of demodulation reference signals associated with the each of the plurality of resource allocation parts is applied.

It is to be understood that both the foregoing general description and the following detailed description of the present invention are exemplary and explanatory and are intended to provide further explanation of the invention as claimed.

Advantageous Effects

According to an embodiment of the present invention, a coordinated multiple-point transmission and reception scheme can be effectively supported by receiving or transmitting downlink control information including a plurality of resource allocation parts in a wireless communication system.

According to an embodiment of the present invention, quasi co-located (QCL) between specific antenna ports can be assumed with respect to the resource allocation parts, and thus when the properties of a specific antenna port is being tracked, receiver processing performance can be enhanced using the properties of the specific antenna port to demodulate/decode a downlink signal.

In addition, according to an embodiment of the present invention, information about resource mapping that considers a specific antenna port is indicated, and thus it may be possible to effectively demodulate/decode a downlink signal.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a diagram illustrating a mapping pattern of a cell-specific reference signal according to an antenna port;

FIG. 6 is a diagram illustrating a mapping pattern of a demodulation reference signal according to an antenna port;

FIG. 11 is a diagram illustrating an example of resource allocation;

BEST MODE

Figure 1:
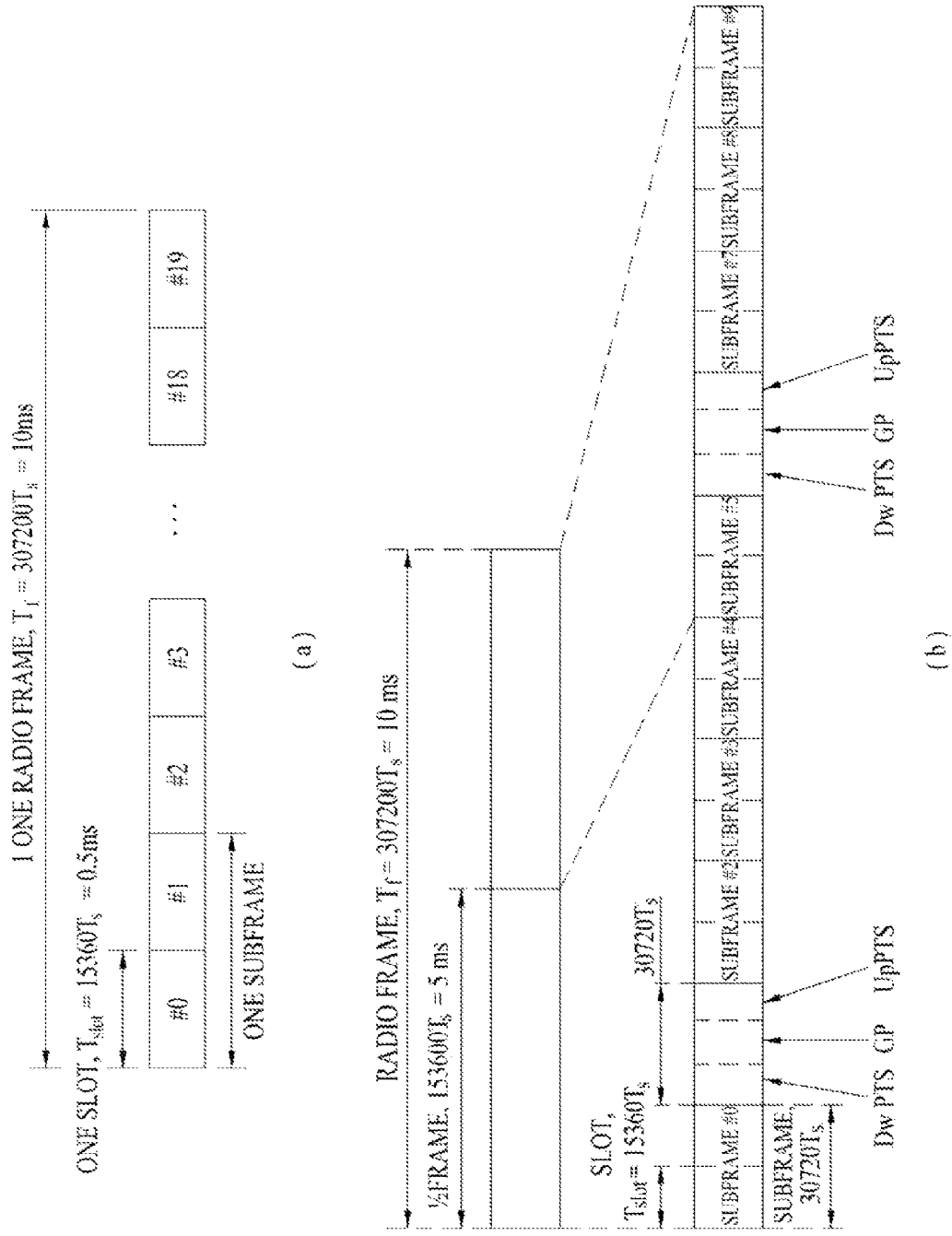
FIG. 1 is a diagram illustrating an example of a configuration of a radio frame used in a wireless communication system.

Reference will now be made in detail to the preferred embodiments of the present invention, examples of which are illustrated in the accompanying drawings. The accompanying drawings illustrate exemplary embodiments of the present invention and provide a more detailed description of the present invention. However, the scope of the present invention should not be limited thereto.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

In the present invention, a user equipment (UE) is fixed or mobile. The UE is a device that transmits and receives user data and/or control information by communicating with a base station (BS). The term 'UE' may be replaced with 'terminal equipment', 'Mobile Station (MS)', 'Mobile Terminal (MT)', 'User Terminal (UT)', 'Subscriber Station (SS)', 'wireless device', 'Personal Digital Assistant (PDA)', 'wireless modem', 'handheld device', etc. A BS is typically a fixed station that communicates with a UE and/or another BS. The BS exchanges data and control information with a UE and another BS. The term BS' may be replaced with 'Advanced Base Station (ABS)', 'Node B', 'evolved-Node B (eNB)', 'Base Transceiver System (BTS)', 'Access Point (AP)', 'Processing Server (PS)', etc. In the following description, BS is commonly called eNB.

In the present invention, a node refers to a fixed point capable of transmitting/receiving a radio signal to/from a UE by communication with the UE. Various eNBs can be used as nodes. For example, a node can be a BS, NB, eNB, pico-cell eNB (PeNB), home eNB (HeNB), relay, repeater, etc. Furthermore, a node may not be an eNB. For example, a node can be a radio remote head (RRH) or a radio remote unit (RRU). The RRH and RRU have power levels lower than that of the eNB. Since the RRH or RRU (referred to as RRH/RRU hereinafter) is connected to an eNB through a dedicated line such as an optical cable in general, cooperative communication according to RRH/RRU and eNB can be smoothly performed compared to cooperative communication according to eNBs connected through a wireless link. At least one antenna is installed per node. An antenna may refer to an antenna port, a virtual antenna or an antenna group. A node may also be called a point. Unlink a conventional centralized antenna system (CAS) (i.e. single node system) in which antennas are concentrated in an eNB and controlled an eNB controller, plural nodes are spaced apart at a predetermined distance or longer in a multi-node system. The plural nodes can be managed by one or more eNBs or eNB controllers that control operations of the nodes or schedule data to be transmitted/received through the nodes. Each node may be connected to an eNB or eNB controller managing the corresponding node via a cable or a dedicated line. In the multi-node system, the same cell identity (ID) or different cell IDs may be used for signal transmission/reception through plural nodes. When plural nodes have the same cell ID, each of the plural nodes operates as an antenna group of a cell. If nodes have different cell IDs in the multi-node system, the multi-node system can be regarded as a multi-cell (e.g. macro-cell/femto-cell/pico-cell) system. When multiple cells respectively configured by plural nodes are overlaid according to coverage, a network configured by multiple cells is called a multi-tier network. The cell ID of the RRH/RRU may be identical to or different from the cell ID of an eNB. When the RRH/RRU and eNB use different cell IDs, both the RRH/RRU and eNB operate as independent eNBs.

In a multi-node system according to the present invention, which will be described below, one or more eNBs or eNB controllers connected to plural nodes can control the plural nodes such that signals are simultaneously transmitted to or received from a UE through some or all nodes. While there is a difference between multi-node systems according to the nature of each node and implementation form of each node, multi-node systems are discriminated from single node systems (e.g. CAS, conventional MIMO systems, conventional relay systems, conventional repeater systems, etc.) since a plurality of nodes provides communication services to a UE in a predetermined time-frequency resource. Accordingly, embodiments of the present invention with respect to a method of performing coordinated data transmission using some or all nodes can be applied to various types of multi-node systems. For example, a node refers to an antenna group spaced apart from another node by a predetermined distance or more, in general. However, embodiments of the present invention, which will be described below, can even be applied to a case in which a node refers to an arbitrary antenna group irrespective of node interval. In the case of an eNB including an X-pole (cross polarized) antenna, for example, the embodiments of the preset invention are applicable on the assumption that the eNB controls a node composed of an H-pole antenna and a V-pole antenna.

A communication scheme through which signals are transmitted/received via plural transmit (Tx)/receive (Rx) nodes, signals are transmitted/received via at least one node selected from plural Tx/Rx nodes, or a node transmitting a downlink signal is discriminated from a node transmitting an uplink signal is called multi-eNB MIMO or CoMP (Coordinated Multi-Point Tx/Rx). Coordinated transmission schemes from among CoMP communication schemes can be categorized into JP (Joint Processing) and scheduling coordination. The former may be divided into JT (Joint Transmission)/JR (Joint Reception) and DPS (Dynamic Point Selection) and the latter may be divided into CS (Coordinated Scheduling) and CB (Coordinated Beamforming) DPS may be called DCS (Dynamic Cell Selection). When JP is performed, more various communication environments can be generated, compared to other CoMP schemes. JT refers to a communication scheme by which plural nodes transmit the same stream to a UE and JR refers to a communication scheme by which plural nodes receive the same stream from the UE. The UE/eNB combine signals received from the plural nodes to restore the stream. In the case of JT/JR, signal transmission reliability can be improved according to transmit diversity since the same stream is transmitted from/to plural nodes. DPS refers to a communication scheme by which a signal is transmitted/received through a node selected from plural nodes according to a specific rule. In the case of DPS, signal transmission reliability can be improved because a node having a good channel state between the node and a UE is selected as a communication node.

In the present invention, a cell refers to a specific geographical area in which one or more nodes provide communication services. Accordingly, communication with a specific cell may mean communication with an eNB or a node providing communication services to the specific cell. A downlink/uplink signal of a specific cell refers to a downlink/uplink signal from/to an eNB or a node providing communication services to the specific cell. A cell providing uplink/downlink communication services to a UE is called a serving cell. Furthermore, channel status/quality of a specific cell refers to channel status/quality of a channel or a communication link generated between an eNB or a node providing communication services to the specific cell and a UE. In 3GPP LTE-A systems, a UE can measure downlink channel state from a specific node using one or more CSI-RSs (Channel State Information Reference Signals) transmitted through antenna port(s) of the specific node on a CSI-RS resource allocated to the specific node. In general, neighboring nodes transmit CSI-RS resources on orthogonal CSI-RS resources. When CSI-RS resources are orthogonal, this means that the CSI-RS resources have different subframe configurations and/or CSI-RS sequences which specify subframes to which CSI-RSs are allocated according to CSI-RS resource configurations, subframe offsets and transmission periods, etc. which specify symbols and subcarriers carrying the CSI RSs.

In the present invention, PDCCH (Physical Downlink Control Channel)/PCFICH (Physical Control Format Indicator Channel)/PHICH (Physical Hybrid automatic repeat request Indicator Channel)/PDSCH (Physical Downlink Shared Channel) refer to a set of time-frequency resources or resource elements respectively carrying DCI (Downlink Control Information)/CFI (Control Format Indicator)/downlink ACK/NACK (Acknowlegement/Negative ACK)/downlink data. In addition, PUCCH (Physical Uplink Control Channel)/PUSCH (Physical Uplink Shared Channel)/PRACH (Physical Random Access Channel) refer to sets of time-frequency resources or resource elements respectively carrying UCI (Uplink Control Information)/uplink data/random access signals. In the present invention, a time-frequency resource or a resource element (RE), which is allocated to or belongs to PDCCH/PCFICH/PHICH/PDSCH/PUCCH/PUSCH/PRACH, is referred to as a PDCCH/PCFICH/PHICH/PDSCH/PUCCH/PUSCH/PRACH RE or PDCCH/PCFICH/PHICH/PDSCH/PUCCH/PUSCH/PRACH resource. In the following description, transmission of PUCCH/PUSCH/PRACH by a UE is equivalent to transmission of uplink control information/uplink data/random access signal through or on PUCCH/PUSCH/PRACH. Furthermore, transmission of PDCCH/PCFICH/PHICH/PDSCH by an eNB is equivalent to transmission of downlink data/control information through or on PDCCH/PCFICH/PHICH/PDSCH.

FIG. 1 illustrates an exemplary radio frame structure used in a wireless communication system. FIG. 1(a) illustrates a frame structure for frequency division duplex (FDD) used in 3GPP LTE/LTE-A and FIG. 1(b) illustrates a frame structure for time division duplex (TDD) used in 3GPP LTE/LTE-A.

Referring to FIG. 1, a radio frame used in 3GPP LTE/LTE-A has a length of 10 ms (307200 Ts) and includes 10 subframes in equal size. The 10 subframes in the radio frame may be numbered. Here, Ts denotes sampling time and is represented as Ts=1/(2048*15 kHz). Each subframe has a length of 1 ms and includes two slots. 20 slots in the radio frame can be sequentially numbered from 0 to 19. Each slot has a length of 0.5 ms. A time for transmitting a subframe is defined as a transmission time interval (TTI). Time resources can be discriminated by a radio frame number (or radio frame index), subframe number (or subframe index) and a slot number (or slot index).

The radio frame can be configured differently according to duplex mode. Downlink transmission is discriminated from uplink transmission by frequency in FDD mode, and thus the radio frame includes only one of a downlink subframe and an uplink subframe in a specific frequency band. In TDD mode, downlink transmission is discriminated from uplink transmission by time, and thus the radio frame includes both a downlink subframe and an uplink subframe in a specific frequency band.

Table 1 shows DL-UL configurations of subframes in a radio frame in the TDD mode.

TABLE 1

| DL-UL configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a downlink subframe, U denotes an uplink subframe and S denotes a special subframe. The special subframe includes three fields of DwPTS (Downlink Pilot TimeSlot), GP (Guard Period), and UpPTS (Uplink Pilot TimeSlot). DwPTS is a period reserved for downlink transmission and UpPTS is a period reserved for uplink transmission. Table 2 shows special subframe configuration.

TABLE 2

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTSee | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | | |
| 5 | $6592 \cdot T_s$ | $4384 \cdot T_s$ | $5120 \cdot T_s$ | $20480 \cdot T_s$ | $4384 \cdot T_s$ | $5120 \cdot T_s$ |
| 6 | $19760 \cdot T_s$ | | | $23040 \cdot T_s$ | | |
| 7 | $21952 \cdot T_s$ | | | — | — | — |
| 8 | $24144 \cdot T_s$ | | | — | — | — |

Figure 2:
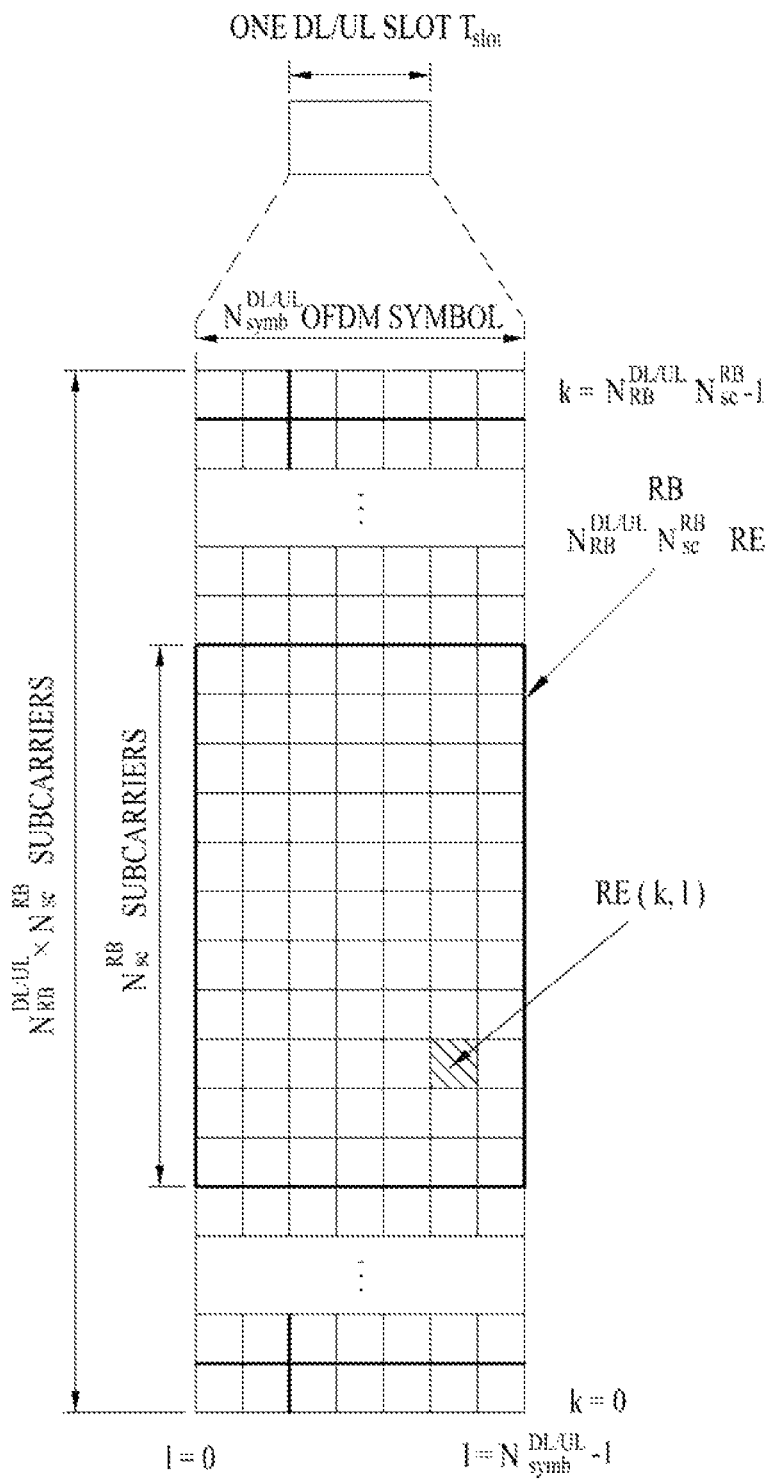
FIG. 2 is a diagram illustrating an example of a configuration of a downlink/uplink (DL/UL) slot in a wireless communication system.

FIG. 2 illustrates an exemplary downlink/uplink slot structure in a wireless communication system. Particularly, FIG. 2 illustrates a resource grid structure in 3GPP LTE/LTE-A. A resource grid is present per antenna port.

Referring to FIG. 2, a slot includes a plurality of OFDM (Orthogonal Frequency Division Multiplexing) symbols in the time domain and a plurality of resource blocks (RBs) in the frequency domain. An OFDM symbol may refer to a symbol period. A signal transmitted in each slot may be represented by a resource grid composed of $N_{RB}^{DL/UL} * N_{sc}^{RB}$ subcarriers and $N_{symb}^{DL/UL}$ OFDM symbols. Here, $N_{RB}^{DL}$ denotes the number of RBs in a downlink slot and $N_{RB}^{UL}$ denotes the number of RBs in an uplink slot. $N_{RB}^{DL}$ and $N_{RB}^{UL}$ respectively depend on a DL transmission bandwidth and a UL transmission bandwidth. $N_{symb}^{DL}$ denotes the number of OFDM symbols in the downlink slot and $N_{symb}^{UL}$ denotes the number of OFDM symbols in the uplink slot. In addition, $N_{sc}^{RB}$ denotes the number of subcarriers constructing one RB.

An OFDM symbol may be called an SC-FDM (Single Carrier Frequency Division Multiplexing) symbol according to multiple access scheme. The number of OFDM symbols included in a slot may depend on a channel bandwidth and the length of a cyclic prefix (CP). For example, a slot includes 7 OFDM symbols in the case of normal CP and 6 OFDM symbols in the case of extended CP. While FIG. 2 illustrates a subframe in which a slot includes 7 OFDM symbols for convenience, embodiments of the present invention can be equally applied to subframes having different numbers of OFDM symbols. Referring to FIG. 2, each OFDM symbol includes $N_{RB}^{DL/UL} * N_{sc}^{RB}$ subcarriers in the frequency domain. Subcarrier types can be classified into a data subcarrier for data transmission, a reference signal subcarrier for reference signal transmission, and null subcarriers for a guard band and a direct current (DC) component. The null subcarrier for a DC component is a subcarrier remaining unused and is mapped to a carrier frequency (f0) during OFDM signal generation or frequency up-conversion. The carrier frequency is also called a center frequency.

An RB is defined by $N_{symb}^{DL/UL}$ (e.g. 7) consecutive OFDM symbols in the time domain and $N_{sc}^{RB}$ (e.g. 12) consecutive subcarriers in the frequency domain. For reference, a resource composed by an OFDM symbol and a subcarrier is called a resource element (RE) or a tone. Accordingly, an RB is composed of $N_{symb}^{DL/UL} * N_{sc}^{RB}$ REs. Each RE in a resource grid can be uniquely defined by an index pair (k, l) in a slot. Here, k is an index in the range of 0 to $N_{symb}^{DL/UL} * N_{sc}^{RB} - 1$ in the frequency domain and l is an index in the range of 0 to $N_{symb}^{DL/UL} - 1$.

Two RBs that occupy $N_{sc}^{RB}$ consecutive subcarriers in a subframe and respectively disposed in two slots of the subframe are called a physical resource block (PRB) pair. Two RBs constituting a PRB pair have the same PRB number (or PRB index). A virtual resource block (VRB) is a logical resource allocation unit for resource allocation. The VRB has the same size as that of the PRB. The VRB may be divided into a localized VRB and a distributed VRB depending on a mapping scheme of VRB into PRB. The localized VRBs are mapped into the PRBs, whereby VRB number (VRB index) corresponds to PRB number. That is, $n_{PRB} = n_{VRB}$ is obtained. Numbers are given to the localized VRBs from 0 to $N_{VRB}^{DL} - 1$, and $N_{VRB}^{DL} = N_{RB}^{DL}$ is obtained. Accordingly, according to the localized mapping scheme, the VRBs having the same VRB number are mapped into the PRBs having the same PRB number at the first slot and the second slot. On the other hand, the distributed VRBs are mapped into the PRBs through interleaving. Accordingly, the VRBs having the same VRB number may be mapped into the PRBs having different PRB numbers at the first slot and the second slot. Two PRBs, which are respectively located at two slots of the subframe and have the same VRB number, will be referred to as a pair of VRBs.

Figure 3:
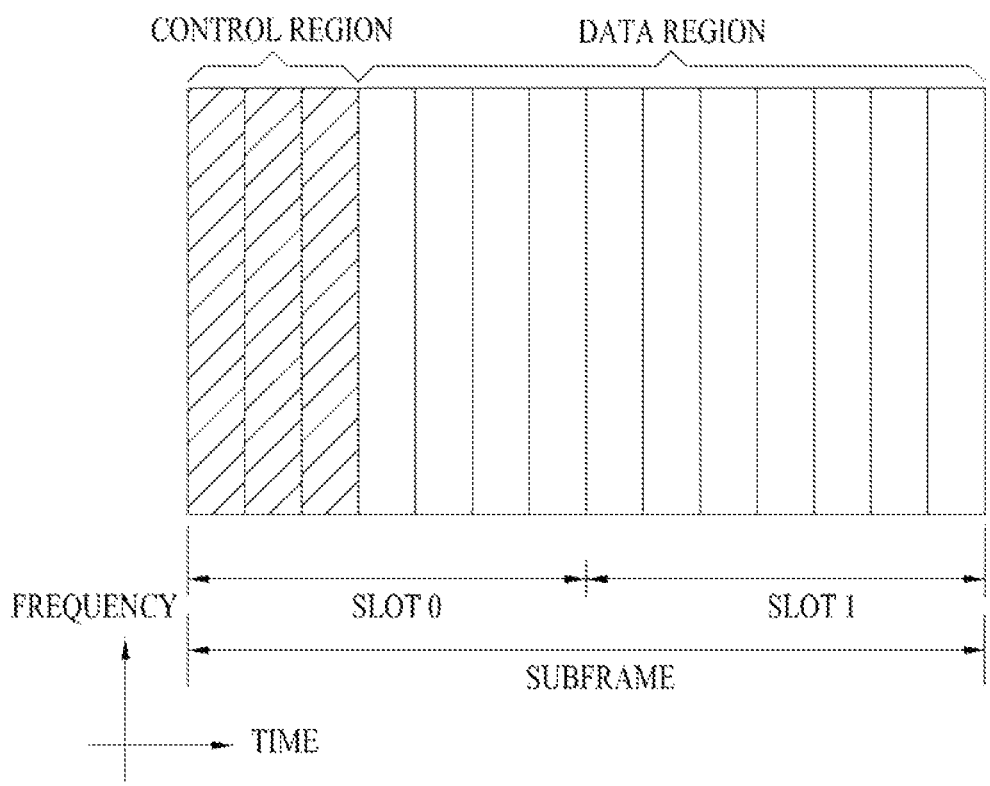
FIG. 3 is a diagram illustrating an example of a configuration of a downlink (DL) subframe used in a 3GPP LTE/LTE-A system.

FIG. 3 illustrates a downlink (DL) subframe structure used in 3GPP LTE/LTE-A.

Referring to FIG. 3, a DL subframe is divided into a control region and a data region. A maximum of three (four) OFDM symbols located in a front portion of a first slot within a subframe correspond to the control region to which a control channel is allocated. A resource region available for PDCCH transmission in the DL subframe is referred to as a PDCCH region hereinafter. The remaining OFDM symbols correspond to the data region to which a physical downlink shared chancel (PDSCH) is allocated. A resource region available for PDSCH transmission in the DL subframe is referred to as a PDSCH region hereinafter. Examples of downlink control channels used in 3GPP LTE include a physical control format indicator channel (PCFICH), a physical downlink control channel (PDCCH), a physical hybrid ARQ indicator channel (PHICH), etc. The PCFICH is transmitted at a first OFDM symbol of a subframe and carries information regarding the number of OFDM symbols used for transmission of control channels within the subframe. The PHICH is a response of uplink transmission and carries an HARQ acknowledgment (ACK)/negative acknowledgment (NACK) signal.

Control information carried on the PDCCH is called downlink control information (DCI). The DCI contains resource allocation information and control information for a UE or a UE group. For example, the DCI includes a transport format and resource allocation information of a downlink shared channel (DL-SCH), a transport format and resource allocation information of an uplink shared channel (UL-SCH), paging information of a paging channel (PCH), system information on the DL-SCH, information about resource allocation of an upper layer control message such as a random access response transmitted on the PDSCH, a transmit control command set with respect to individual UEs in a UE group, a transmit power control command, information on activation of a voice over IP (VoIP), downlink assignment index (DAI), etc. The transport format and resource allocation information of the DL-SCH are also called DL scheduling information or a DL grant and the transport format and resource allocation information of the UL-SCH are also called UL scheduling information or a UL grant. The size and purpose of DCI carried on a PDCCH depend on DCI format and the size thereof may be varied according to coding rate. Various formats, for example, formats 0 and 4 for uplink and formats 1, 1A, 1B, 1C, 1D, 2, 2A, 2B, 2C, 3 and 3A for downlink, have been defined in 3GPP LTE. Control information such as a hopping flag, information on RB allocation, modulation coding scheme (MCS), redundancy version (RV), new data indicator (NDI), information on transmit power control (TPC), cyclic shift demodulation reference signal (DMRS), UL index, channel quality information (CQI) request, DL assignment index, HARQ process number, transmitted precoding matrix indicator (TPMI), precoding matrix indicator (PMI), etc. is selected and combined based on DCI format and transmitted to a UE as DCI.

In general, a DCI format for a UE depends on transmission mode (TM) set for the UE. In other words, only a DCI format corresponding to a specific TM can be used for a UE configured in the specific TM.

A PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups (REGs). For example, a CCE corresponds to 9 REGs and an REG corresponds to 4 REs. 3GPP LTE defines a CCE set in which a PDCCH can be located for each UE. A CCE set from which a UE can detect a PDCCH thereof is called a PDCCH search space, simply, search space. An individual resource through which the PDCCH can be transmitted within the search space is called a PDCCH candidate. A set of PDCCH candidates to be monitored by the UE is defined as the search space. In 3GPP LTE/LTE-A, search spaces for DCI formats may have different sizes and include a dedicated search space and a common search space. The dedicated search space is a UE-specific search space and is configured for each UE. The common search space is configured for a plurality of UEs. Aggregation levels defining the search space is as follows.

TABLE 3

| | Search Space | | |
|---|---|---|---|
| Type | Aggregation Level L | Size [in CCEs] | Number of PDCCH candidates $M^{(L)}$ |
| UE-specific | 1 | 6 | 6 |
| | 2 | 12 | 6 |
| | 4 | 8 | 2 |
| | 8 | 16 | 2 |

TABLE 3-continued

| | Search Space | | |
|---|---|---|---|
| Type | Aggregation Level L | Size [in CCEs] | Number of PDCCH candidates $M^{(L)}$ |
| Common | 4 | 16 | 4 |
| | 8 | 16 | 2 |

A PDCCH candidate corresponds to 1, 2, 4 or 8 CCEs according to CCE aggregation level. An eNB transmits a PDCCH (DCI) on an arbitrary PDCCH candidate with in a search space and a UE monitors the search space to detect the PDCCH (DCI). Here, monitoring refers to attempting to decode each PDCCH in the corresponding search space according to all monitored DCI formats. The UE can detect the PDCCH thereof by monitoring plural PDCCHs. Since the UE does not know the position in which the PDCCH thereof is transmitted, the UE attempts to decode all PDCCHs of the corresponding DCI format for each subframe until a PDCCH having the ID thereof is detected. This process is called blind detection (or blind decoding (BD)).

The eNB can transmit data for a UE or a UE group through the data region. Data transmitted through the data region may be called user data. For transmission of the user data, a physical downlink shared channel (PDSCH) may be allocated to the data region. A paging channel (PCH) and downlink-shared channel (DL-SCH) are transmitted through the PDSCH. The UE can read data transmitted through the PDSCH by decoding control information transmitted through a PDCCH. Information representing a UE or a UE group to which data on the PDSCH is transmitted, how the UE or UE group receives and decodes the PDSCH data, etc. is included in the PDCCH and transmitted. For example, if a specific PDCCH is CRC (cyclic redundancy check)-masked having radio network temporary identify (RNTI) of "A" and information about data transmitted using a radio resource (e.g. frequency position) of "B" and transmission format information (e.g. transport block size, modulation scheme, coding information, etc.) of "C" is transmitted through a specific DL subframe, the UE monitors PDCCHs using RNTI information and a UE having the RNTI of "A" detects a PDCCH and receives a PDSCH indicated by "B" and "C" using information about the PDCCH.

A reference signal (RS) to be compared with a data signal is necessary for the UE to demodulate a signal received from the eNB. A reference signal refers to a predetermined signal having a specific waveform, which is transmitted from the eNB to the UE or from the UE to the eNB and known to both the eNB and UE. The reference signal is also called a pilot. Reference signals are categorized into a cell-specific RS shared by all UEs in a cell and a modulation RS (DM RS) dedicated for a specific UE. A DM RS transmitted by the eNB for demodulation of downlink data for a specific UE is called a UE-specific RS. Both or one of DM RS and CRS may be transmitted on downlink. When only the DM RS is transmitted without CRS, an RS for channel measurement needs to be additionally provided because the DM RS transmitted using the same precoder as used for data can be used for demodulation only. For example, in 3GPP LTE(-A), CSI-RS corresponding to an additional RS for measurement is transmitted to the UE such that the UE can measure channel state information. CSI-RS is transmitted in each transmission period corresponding to a plurality of subframes based on the fact that channel state variation with time is not large, unlike CRS transmitted per subframe.

Figure 4:
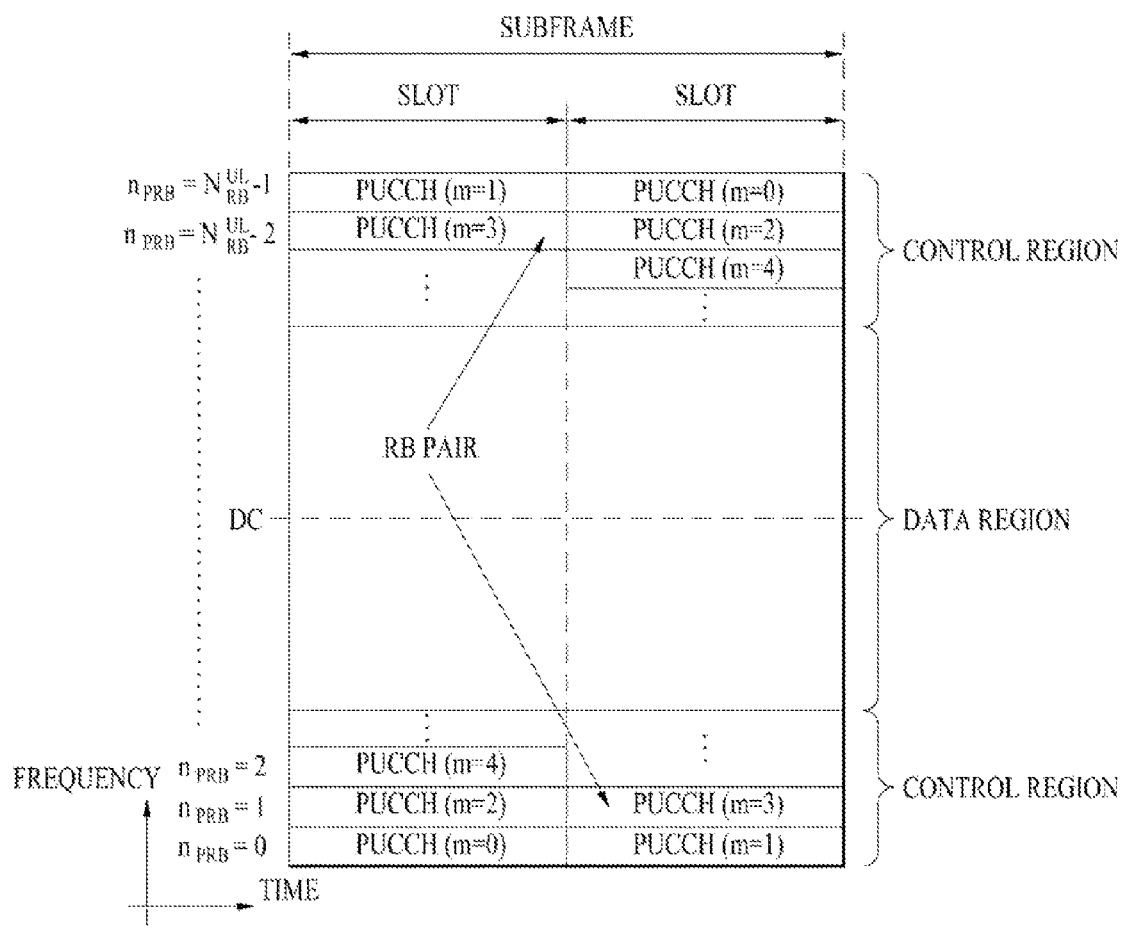
FIG. 4 is a diagram illustrating an example of a configuration of an uplink (UL) subframe used in a 3GPP LTE/LTE-A system.

FIG. 4 illustrates an exemplary uplink subframe structure used in 3GPP LTE/LTE-A.

Referring to FIG. 4, a UL subframe can be divided into a control region and a data region in the frequency domain. One or more PUCCHs (physical uplink control channels) can be allocated to the control region to carry uplink control information (UCI). One or more PUSCHs (Physical uplink shared channels) may be allocated to the data region of the UL subframe to carry user data.

In the UL subframe, subcarriers spaced apart from a DC subcarrier are used as the control region. In other words, subcarriers corresponding to both ends of a UL transmission bandwidth are assigned to UCI transmission. The DC subcarrier is a component remaining unused for signal transmission and is mapped to the carrier frequency f0 during frequency up-conversion. A PUCCH for a UE is allocated to an RB pair belonging to resources operating at a carrier frequency and RBs belonging to the RB pair occupy different subcarriers in two slots. Assignment of the PUCCH in this manner is represented as frequency hopping of an RB pair allocated to the PUCCH at a slot boundary. When frequency hopping is not applied, the RB pair occupies the same subcarrier.

The PUCCH can be used to transmit the following control information.

Scheduling Request (SR): This is information used to request a UL-SCH resource and is transmitted using On-Off Keying (OOK) scheme.

HARQ ACK/NACK: This is a response signal to a downlink data packet on a PDSCH and indicates whether the downlink data packet has been successfully received. A 1-bit ACK/NACK signal is transmitted as a response to a single downlink codeword and a 2-bit ACK/NACK signal is transmitted as a response to two downlink codewords. HARQ-ACK responses include positive ACK (ACK), negative ACK (HACK), discontinuous transmission (DTX) and NACK/DTX. Here, the term HARQ-ACK is used interchangeably with the term HARQ ACK/NACK and ACK/NACK.

Channel State Indicator (CSI): This is feedback information about a downlink channel. Feedback information regarding MIMO includes a rank indicator (RI) and a precoding matrix indicator (PMI).

The quantity of control information (UCI) that a UE can transmit through a subframe depends on the number of SC-FDMA symbols available for control information transmission. The SC-FDMA symbols available for control information transmission correspond to SC-FDMA symbols other than SC-FDMA symbols of the subframe, which are used for reference signal transmission. In the case of a subframe in which a sounding reference signal (SRS) is configured, the last SC-FDMA symbol of the subframe is excluded from the SC-FDMA symbols available for control information transmission. A reference signal is used to detect coherence of the PUCCH. The PUCCH supports various formats according to information transmitted thereon. Table 4 shows the mapping relationship between PUCCH formats and UCI in LTE/LTE-A.

TABLE 4

| PUCCH format | Modulation scheme | Number of bits per subframe, $M_{bit}$ | Usage | Etc. |
| --- | --- | --- | --- | --- |
| 1 | N/A | N/A | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codeword |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 4, PUCCH formats 1/1a/1b are used to transmit ACK/NACK information, PUCCH format 2/2a/2b are used to carry CSI such as CQI/PMI/RI and PUCCH format 3 is used to transmit ACK/NACK information.

Reference Signal (RS)

When a packet is transmitted in a wireless communication system, signal distortion may occur during transmission since the packet is transmitted through a radio channel. To correctly receive a distorted signal at a receiver, the distorted signal needs to be corrected using channel information. To detect channel information, a signal known to both a transmitter and the receiver is transmitted and channel information is detected with a degree of distortion of the signal when the signal is received through a channel. This signal is called a pilot signal or a reference signal.

When data is transmitted/received using multiple antennas, the receiver can receive a correct signal only when the receiver is aware of a channel state between each transmit antenna and each receive antenna. Accordingly, a reference signal needs to be provided per transmit antenna, more specifically, per antenna port.

Reference signals can be classified into an uplink reference signal and a downlink reference signal. In LTE, the uplink reference signal includes:

i) a demodulation reference signal (DMRS) for channel estimation for coherent demodulation of information transmitted through a PUSCH and a PUCCH; and ii) a sounding reference signal (SRS) used for an eNB to measure uplink channel quality at a frequency of a different network.

The downlink reference signal includes:

i) a cell-specific reference signal (CRS) shared by all UEs in a cell;

ii) a UE-specific reference signal for a specific UE only;

iii) a DMRS transmitted for coherent demodulation when a PDSCH is transmitted;

iv) a channel state information reference signal (CSI-RS) for delivering channel state information (CSI) when a downlink DMRS is transmitted;

v) a multimedia broadcast single frequency network (MB-SFN) reference signal transmitted for coherent demodulation of a signal transmitted in MBSFN mode; and vi) a positioning reference signal used to estimate geographic position information of a UE.

Reference signals can be classified into a reference signal for channel information acquisition and a reference signal for data demodulation. The former needs to be transmitted in a wide band as it is used for a UE to acquire channel information on downlink transmission and received by a UE even if the UE does not receive downlink data in a specific subframe. This reference signal is used even in a handover situation. The latter is transmitted along with a corresponding resource by an eNB when the eNB transmits a downlink signal and is used for a UE to demodulate data through channel measurement. This reference signal needs to be transmitted in a region in which data is transmitted.

FIG. 5 illustrates cell specific reference signal (CRS) mapping patterns according to antenna ports. The CRS is used for obtaining channel information and demodulating data, a UE-specific reference signal is used for demodulating data. The CRS is transmitted for wideband in every subframe, and the reference signal for up to four (4) antenna ports is transmitted according to the number of the transmission antennas of the eNB.

For example, if the number of the transmission antennas of the eNB is two, the CRS for #0 and #1 antenna ports is transmitted and if the number of the transmission antennas of the eNB is four, the CRS for #0 to #3 antenna ports is transmitted.

FIG. 6 illustrates demodulation reference signal mapping patterns according to antenna ports. A DMRS is a reference signal defined for a UE to perform channel estimation with respect to a PDSCH. The DMRS can be used in transmission modes 7, 8 and 9. The DMRS was initially defined for single layer transmission of antenna port #5 and then extended for spatial multiplexing of a maximum of 8 layers. The DMRS, which is also called a UE specific reference signal, is transmitted for a specific UE only and thus can be transmitted in an RB through which a PDSCH for the specific UE is transmitted.

Description will be given of generation of a DMRS for a maximum of 8 layers. With regard to the DMRS, a reference signal sequence r(m) generated according to Equation 1 can be mapped to complex-valued modulation symbols $a_{k,l}^{(p)}$ according to Equation 2 and transmitted. FIG. 6 illustrates mapping of the DMRS to a resource grid in a subframe with respect to antenna ports 7 to 10 in the normal CP case.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 1]}$$

$$m = \begin{cases} 0, 1, \ldots, 12N_{RB}^{max,DL} - 1 & \text{normal } CP \\ 0, 1, \ldots, 16N_{RB}^{max,DL} - 1 & \text{extended } CP \end{cases}$$

Here, r(m) denotes the reference signal sequence, c(i) denotes a pseudo random sequence and $N_{RB}^{max,DL}$ denotes a maximum number of RBs of a downlink bandwidth.

$$a_{k,l}^{(p)} = w_p(l') \cdot r(3 \cdot l' \cdot N_{RB}^{max,DL} + 3 \cdot n_{PRB} + m') \quad \text{[Equation 2]}$$

$$w_p(i) = \begin{cases} \overline{w}_p(i) & (m' + n_{PRB}) \mod 2 = 0 \\ \overline{w}_p(3-i) & (m' + n_{PRB}) \mod 2 = 1 \end{cases}$$

$$k = 5m' + N_{sc}^{RB} n_{PRB} + k'$$

$$k' = \begin{cases} 1 & p \in \{7, 8, 11, 13\} \\ 0 & p \in \{9, 10, 12, 14\} \end{cases}$$

$$l = \begin{cases} l' \mod 2 + 2 & \text{if in a special subframe with configuration 3, 4, 8 or 9} \\ l' \mod 2 + 2 + 3\lfloor l'/2 \rfloor & \text{if in a special subframe with configuration 1, 2, 6 or 7} \\ l' \mod 2 + 5 & \text{if not in a special subframe} \end{cases}$$

$$l' = \begin{cases} 0, 1, 2, 3 & \text{if } n_s \mod 2 = 0 \text{ and in a special subframe with configuration 1, 2, 6 or 7} \\ 0, 1 & \text{if } n_s \mod 2 = 0 \text{ and not in special subframe with configuration 1, 2, 6 or 7} \\ 0, 1 & \text{if } n_s \mod 2 = 1 \text{ and not in special subframe with configuration 1, 2, 6 or 7} \end{cases}$$

$$m' = 0, 1, 2$$

As represented in Equation 2, when the reference signal sequence is mapped to complex-valued modulation symbols, an orthogonal sequence $\overline{w}_p(i)$ is applied according to antenna port, as shown in Table 5.

TABLE 5

| Antenna port p | $[\overline{w}_p(0)\ \overline{w}_p(1)\ \overline{w}_p(2)\ \overline{w}_p(3)]$ |
|---|---|
| 7 | [+1 +1 +1 +1] |
| 8 | [+1 −1 +1 −1] |
| 9 | [+1 +1 +1 +1] |
| 10 | [+1 −1 +1 −1] |
| 11 | [+1 +1 −1 −1] |
| 12 | [−1 −1 +1 +1] |

TABLE 5-continued

| Antenna port p | $[\bar{w}_p(0)\ \bar{w}_p(1)\ \bar{w}_p(2)\ \bar{w}_p(3)]$ |
|---|---|
| 13 | [+1 −1 −1 +1] |
| 14 | [−1 +1 +1 −1] |

Figure 7:
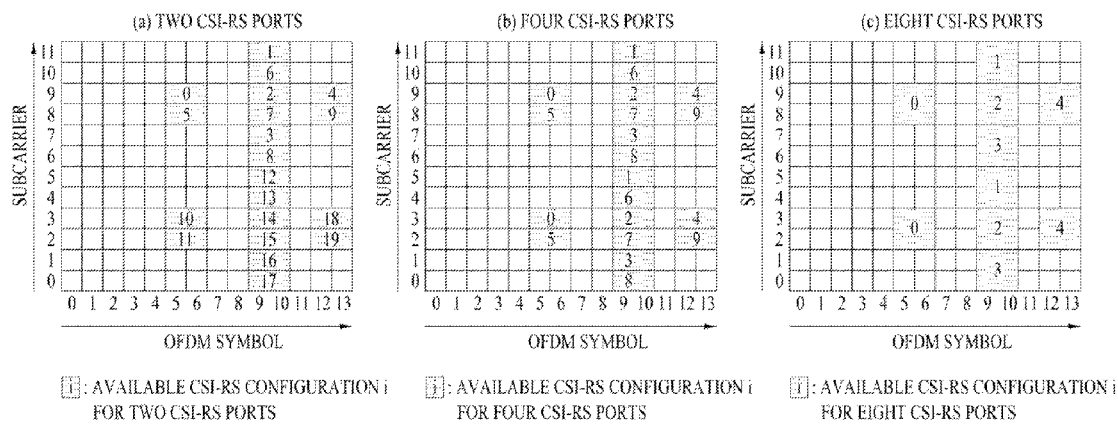
FIG. 7 is a diagram illustrating a mapping pattern of a channel state information reference signal according to an antenna port.

FIG. 7 illustrates CSI-RS mapping patterns according to antenna ports. An antenna port for CSI-RS transmission is referred to as a CSI-RS port and positions of resources in a predetermined resource region, in which CSI-RSs are transmitted through CSI-RS ports corresponding thereto, are referred to as a CSI-RS pattern or CSI-RS resource configuration. In addition, a time-frequency resource to/through which a CSI-RS is allocated/transmitted is referred to as a CSI-RS resource. For example, a resource element (RE) used for CSI-RS transmission is referred to as a CSI-RS RE. While the position of an RE through which a CRS is transmitted per antenna port is fixed, the CSI-RS has a maximum of 32 different configurations in order to reduce inter-cell interference (ICI) in a multi-cell environment including a heterogeneous network environment. A CSI-RS configuration depends on the number of antenna ports in a cell and CSI-RS configurations are set such that neighboring cells have different configurations. The CSI-RS supports up to 8 antenna ports (p=15, p=15,16, p=15, . . . , 18 and p=15, . . . , 22), distinguished from the CRS, and is defined for Δf=15 kHz only. Antenna ports p=15, . . . , 22 may respectively correspond to CSI-RS ports p=0, . . . , 7 in the following description.

Tables 6 and 7 show CSI-RS configurations that can be used in a frame structure (referred to as FS-1 hereinafter) for FDD (frequency division duplex) and a frame structure (referred to as FS-2 hereinafter) for TDD (time division duplex). Particularly, Table 6 shows CSI-RS configurations in a subframe having the normal CP and Table 7 shows CSI-RS configurations in a subframe having the extended CP.

TABLE 6

| | CSI-RS configuration | Number of CSI-RSs configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| FS-1 and FS-2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | | |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| FS-2 only | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |

TABLE 6-continued

| CSI-RS configuration | Number of CSI-RSs configured | | | | | |
|---|---|---|---|---|---|---|
| | 1 or 2 | | 4 | | 8 | |
| | (k', l') | $n_s$ mod2 | (k', l') | $n_s$ mod2 | (k', l') | $n_s$ mod2 |
| 26 | (5, 1) | 1 | | | | |
| 27 | (4, 1) | 1 | | | | |
| 28 | (3, 1) | 1 | | | | |
| 29 | (2, 1) | 1 | | | | |
| 30 | (1, 1) | 1 | | | | |
| 31 | (0, 1) | 1 | | | | |

TABLE 7

| | CSI-RS configuration | Number of CSI-RSs configured | | | | | |
|---|---|---|---|---|---|---|---|
| | | 1 or 2 | | 4 | | 8 | |
| | | (k', l') | $n_s$ mod2 | (k', l') | $n_s$ mod2 | (k', l') | $n_s$ mod2 |
| FS-1 and FS-2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| FS-2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

When (k', l') (k' being a subcarrier index in a resource block and l' being an OFDM symbol index in a slot) in Tables 5 and 6 and $n_s$ ($n_s$ being a slot index in a frame) are applied to the following equation, a time-frequency resource used by each CSI-RS port to transmit a corresponding CSI-RS can be determined. That is, a CSI-RS sequence may be mapped to complex-valued modulation symbols used as reference symbols for CSI-RS port p in slot $n_s$ in a subframe (CSI-RS subframe) configured for CSI-RS transmission according to the following equation.

$$a_{k,l}^{(p)} = w_{l''} \cdot r_{l,n_s}(m') \qquad \text{[Equation 3]}$$

In Equation 3, a resource index pair (k, l) (k being a subcarrier index and l being an OFDM symbol index in a subframe) used for CSI-RS port p for CSI-RS transmission can be determined according to the following equation.

$$k = k' + 12m + \begin{cases} -0 & \text{for } p \in \{0, 1\}, \text{ normal cyclic prefix} \\ -6 & \text{for } p \in \{2, 3\}, \text{ normal cyclic prefix} \\ -1 & \text{for } p \in \{4, 5\}, \text{ normal cyclic prefix} \\ -7 & \text{for } p \in \{6, 7\}, \text{ normal cyclic prefix} \\ -0 & \text{for } p \in \{0, 1\}, \text{ extended cyclic prefix} \\ -3 & \text{for } p \in \{2, 3\}, \text{ extended cyclic prefix} \\ -6 & \text{for } p \in \{4, 5\}, \text{ extended cyclic prefix} \\ -9 & \text{for } p \in \{6, 7\}, \text{ extended cyclic prefix} \end{cases}$$

[Equation 4]

$$l = l' +$$

$$\begin{cases} l'' & \textit{CSI reference signal configurations 0-19, normal cyclic prefix} \\ 2l'' & \textit{CSI reference signal configurations 20-31, normal cyclic prefix} \\ l'' & \textit{CSI reference signal configurations 0-27, extended cyclic prefix} \end{cases}$$

$$w_{l''} = \begin{cases} 1 & p \in \{0, 1, 2, 3\} \\ (-1)^{l''} & p \in \{4, 5, 6, 7\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

FIG. 7 illustrates CSI-RS configurations. Particularly, FIG. 7 illustrates CSI-RS configurations according to Equation 3 and Table 6 and shows positions of resources occupied by CSI-RSs in one RB pair in each CSI-RS configuration.

FIG. 7(a) shows 20 CSI-RS configurations available for CSI-RS transmission through 2 CSI-RS ports, FIG. 7(b) shows 10 CSI-RS configurations available for CSI-RS transmission through 4 CSI-RS ports and FIG. 7(c) shows 5 CSI-RS configurations available for CSI-RS transmission through 8 CSI-RS ports. CSI-RS configurations defined on the basis of the number of CSI-RS ports may be numbered.

When a BS sets 2 antenna ports for CSI-RS transmission, that is, sets 2 CSI-RS ports, CSI-RS transmission is performed in a radio resource corresponding to one of the 20 CSI-RS configurations, shown in FIG. 7(a), through the 2 CSI-RS ports. When 4 CSI-RS ports are set for a specific cell, CSI-RSs are transmitted in resources corresponding to CSI-RS configurations for the specific cell from among the 10 CSI-RS configurations, shown in FIG. 7(b), through the 4 CSI-RS ports. When 8 CSI-RS ports are set for the specific cell, CSI-RSs are transmitted in resources corresponding to CSI-RS configurations for the specific cell from among the 5 CSI-RS configurations, shown in FIG. 7(c), through the 8 CSI-RS ports.

CSI-RS configurations shown in Tables 6 and 7 have a nested property. The nested property means that a CSI-RS configuration for a large number of CSI-RS ports becomes a super set of a CSI-RS configuration for a small number of CSI-RS ports. Referring to FIGS. 7(b) and 7(c), REs corresponding to CSI-RS configuration 0 with respect to 4 CSI-RS ports are included in resources corresponding to CSI-RS configuration 0 with respect to 8 CSI-RS ports.

A plurality of CSI-RSs may be used in a predetermined cell. In case of a non-zero power CSI-RS, only a CSI-RS with respect to one CSI-RS configuration is transmitted. In case of a zero power CSI-RS, a CSI-RS with respect to a plurality of CSI-RS configurations may be transmitted. A UE assumes zero transmission power for resources other than resources that need to be assumed to correspond to non-zero power CSI-RSs, from among resources corresponding to zero power CSI-RSs. For example, with regard to a radio frame for TDD, a CSI-RS is not transmitted in a special subframe in which downlink transmission and uplink transmission coexist, a subframe in which a paging message is transmitted and a subframe in which transmission of a synchronization signal, a physical broadcast channel (PBCH) or system information block type 1 (SIB1) collide with a CSI-RS, and the UE assumes that a CSI-RS is not transmitted in these subframes. A time-frequency resource used for a CSI-RS port to transmit the corresponding CSI-RS is not used for PDSCH transmission through any antenna port and is not used for CSI-RS transmission through an antenna port other than the corresponding CSI-RS port.

Since time-frequency resources used for CSI-RS transmission cannot be used for data transmission, data throughput decreases as CSI-RS overhead increases. In view of this, a CSI-RS is configured to be transmitted at a predetermined transmission interval corresponding to a plurality of subframes rather than being configured to be transmitted per subframe. In this case, CSI-RS transmission overhead can be remarkably reduced compared to a case in which the CSI-RS is transmitted per subframe. In the following description, a subframe configured for CSI-RS transmission is referred to as a CSI-RS subframe. A subframe configured for CSI-RS transmission may be defined by CSI-RS transmission periodicity and subframe offset. The CSI-RS transmission periodicity and subframe offset are referred to as a CSI-RS subframe configuration. Table 8 shows CSI-RS transmission periodicity $T_{CSI-RS}$ and subframe offset $\Delta_{CSI-RS}$.

TABLE 8

| CSI-RS subframe configuration $I_{CSI-RS}$ | CSI-RS periodicity $T_{CSI-RS}$ (subframes) | CSI-RS subframe offset $\Delta_{CSI-RS}$ (subframes) |
| --- | --- | --- |
| $I_{CSI-RS} \leq 4$ | 5 | $I_{CSI-RS}$ |
| $5 \leq I_{CSI-RS} \leq 14$ | 10 | $I_{CSI-RS}-5$ |
| $15 \leq I_{CSI-RS} \leq 34$ | 20 | $I_{CSI-RS}-15$ |
| $35 \leq I_{CSI-RS} \leq 74$ | 40 | $I_{CSI-RS}-35$ |
| $75 \leq I_{CSI-RS} \leq 154$ | 80 | $I_{CSI-RS}-75$ |

In Table 8, $I_{CSI-RS}$ specifies CSI-RS transmission periodicity and subframe offset.

The BS may determine or adjust $I_{CSI-RS}$ and transmit $I_{CSI-RS}$ to UEs within the coverage of the corresponding cell. A UE may be aware of a CSI-RS subframe in which a CSI-RS of the cell (referred to as a serving cell, hereinafter) that provides communication services to the UE is transmitted on the basis of $I_{CSI-RS}$. The UE may determine a subframe which satisfies the following equation as a CSI-RS subframe.

$$(10n_f + \lfloor n_s/2 \rfloor - \Delta_{CSI-RS}) \bmod T_{CSI-RS} = 0 \quad \text{[Equation 5]}$$

Here, $n_f$ denotes a system frame number and $n_s$ represents a slot number of a radio frame.

For example, referring to Table 8, when $I_{CSI-RS}$ is greater than 5 and less than 14, a CSI-RS is transmitted every 10 subframes, starting from a subframe corresponding to a subframe number $I_{CSI-RS}-5$.

The BS may notify the UE of the following parameters through higher layer signaling (e.g. medium access control (MAC) signaling or radio resource control (RRC) signaling).

Number of CSI-RS ports

CSI-RS configuration (refer to Tables 5 and 6, for example)

CSI-RS subframe configuration (refer to Table 7, for example)

CSI-RS subframe configuration periodicity $T_{CSI-RS}$

CSI-RS subframe offset $\Delta_{CSI-RS}$

The BS may notify the UE of a CSI-RS configuration transmitted with zero power and a subframe configuration for transmission of a zero power CSI-RS as necessary. The CSI-RS configurations of Tables 6 and 7 may be used as the zero power CSI-RS configuration and the CSI-RS subframe configuration of Table 8 may be used as the subframe configuration for transmission of the zero power CSI-RS.

CoMP (Coordinated Multiple Point Transmission and Reception)

In accordance with the improved system throughput requirements of the 3GPP LTE-A system, CoMP transmission/reception technology (also referred to as Co-MIMO, collaborative MIMO or network MIMO) has recently been proposed. The CoMP technology can increase throughput of a UE located at a cell edge and also increase average sector throughput.

In general, in a multi-cell environment in which a frequency reuse factor is 1, the performance of the UE located on the cell edge and average sector throughput may be reduced due to Inter-Cell Interference (ICI). In order to reduce the ICI, in the legacy LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, it is preferable that the ICI is reduced or the UE reuses the ICI as a desired signal. In order to accomplish the above object, a CoMP transmission scheme may be applied.

The CoMP scheme applicable to the downlink may be largely classified into a Joint Processing (JP) scheme and a Coordinated Scheduling/Beamforming (CS/CB) scheme.

In the JP scheme, each point (eNB) of a CoMP unit may use data. The CoMP unit refers to a set of eNBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by coordination of the cells of the CoMP unit.

In uplink, coordinated multi-point reception refers to reception of a signal transmitted by coordination of a plurality of geographically separated points. The CoMP scheme applicable to the uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by the coordination of the cells of the CoMP unit.

In addition, one case in which there are multiple UL points (i.e., multiple Rx points) is referred to as UL CoMP, and the other case in which there are multiple DL points (i.e., multiple Tx points) is referred to as DL CoMP.

HARQ Process

In the LTE FDD system, eight Stop-And-Wait (SAW) HARQ processes are supported on both the uplink and the downlink in accordance with a constant round-trip time (RTT) of 8 ms.

The respective HARQ processes are defined by a unique HARQ process identifier of 3 bit size, and individual soft buffer allocation for combination of retransmitted data is required for a reception end (that is, UE at the downlink HARQ process, and eNodeB at the uplink HARQ process). Also, in the LTE system, it is defined that information such as a new data indicator (NDI), a redundancy version (RV) and a modulation and coding scheme (MCS) level is signaled to the reception end.

In the meantime, the downlink HARQ process of the LTE system is an adaptive asynchronous scheme. Accordingly, downlink control information for the HARQ process is explicitly accompanied per downlink transmission. On the other hand, the uplink HARQ process of the LTE system is a synchronous scheme, and may be performed adaptively or non-adaptively. Since the uplink non-adaptive HARQ scheme does not accompany signaling of explicit control information, sequence such as previously set RV sequence, that is, 0, 2, 3, 1, 0, 2, 3, 1, . . . is required for continuous packet transmission. However, according to the uplink adaptive HARQ scheme, RV is signaled explicitly.

Overview of Enhanced-PDCCH (EPDCCH)

In the LTE system following LTE Release 11, an enhanced-PDCCH (EPDCCH) has been considered as a solution for capacity lack of a PDCCH due to coordinated multi point (CoMP) or multi user-multiple input multiple output (MU-MIMO) or PDCCH performance reduction due to inter-cell interference. In the EPDCCH, in order to obtain precoding gain, etc., channel estimation may be performed based on a DMRS, unlike a legacy CRS-based PDCCH.

EPDCCH transmission may be divided into localized EPDCCH transmission and distributed EPDCCH transmission according to the configuration of the PRB pair used for EPDCCH transmission. Localized EPDCCH transmission means that ECCEs used for transmission of one EPDCCH are adjacent in the frequency domain and specific precoding is applicable in order to obtain beamforming gain. For example, localized EPDCCH transmission may be based on consecutive ECCEs corresponding in number to the aggregation level. In contrast, distributed EPDCCH transmission means that one EPDCCH is transmitted in separated PRB pairs in the frequency domain and has frequency diversity gain. For example, distributed EPDCCH transmission may be based on an ECCE composed of four EREGs which are respectively included in the separated PRB pairs in the frequency domain.

The UE may perform blind decoding as in a legacy LTE/LTE-A system, in order to receive/acquire control information (DCI) via an EPDCCH. More specifically, the UE may attempt (monitor) decoding with respect to a set of EPDCCH candidates per aggregation level, for DCI formats corresponding to a set transmission mode. The set of EPDCCH candidates to be monitored may be referred to as an EPDCCH UE-specific search space and this search space may be set/configured according to aggregation level. In addition, the aggregation level may be {1, 2, 4, 8, 16, 32} according to subframe type, CP length and the amount of available resources in a PRB pair, slightly differently from the legacy LTE/LTE-A system.

In the case of a UE configured with an EPDCCH, REs included in a PRB pair set are indexed with EREGs and EREGs are indexed with ECCE units. EPDCCH candidates constituting a search space may be determined based on the indexed ECCEs and blind decoding may be performed to receive control information. Here, the EREG corresponds to an REG of the legacy LTE/LTE-A, the ECCE corresponds to a CCE, and one PRB pair may include 16 EREGs.

With respect to each serving cell, one UE may configure one or two EPDCCH PRB sets for PDCCH monitoring via higher layer signaling.

In 3GPP LTE Rel-11, a UE subjected to a CoMP scheme may estimate a channel for TPs that can temporarily participate in CoMP using a channel state information reference signal (CSI-RS) resource defined as a CoMP measurement set and feedback CSI such as a precoding matrix indicator (PMI), a channel quality indicator (CQI), a rank indicator (RI), etc. to a serving cell of the UE based on the estimated channel value. A network may configure a dynamic point selection (DPS) scheme for selecting a TP with relatively excellent channel quality and performing data transmission on the UE based on fed back CSI information, a coordinated scheduling/coordinated beamforming (CS/CB) scheme for controlling scheduling and beamforming by TPs that actually participate in CoMP to reduce mutual interference, and a joint transmission (JT) scheme for transmitting the same data to a UE by TPs that actually participate in CoMP.

Quasi Co-Located (QCL)

Figure 8:
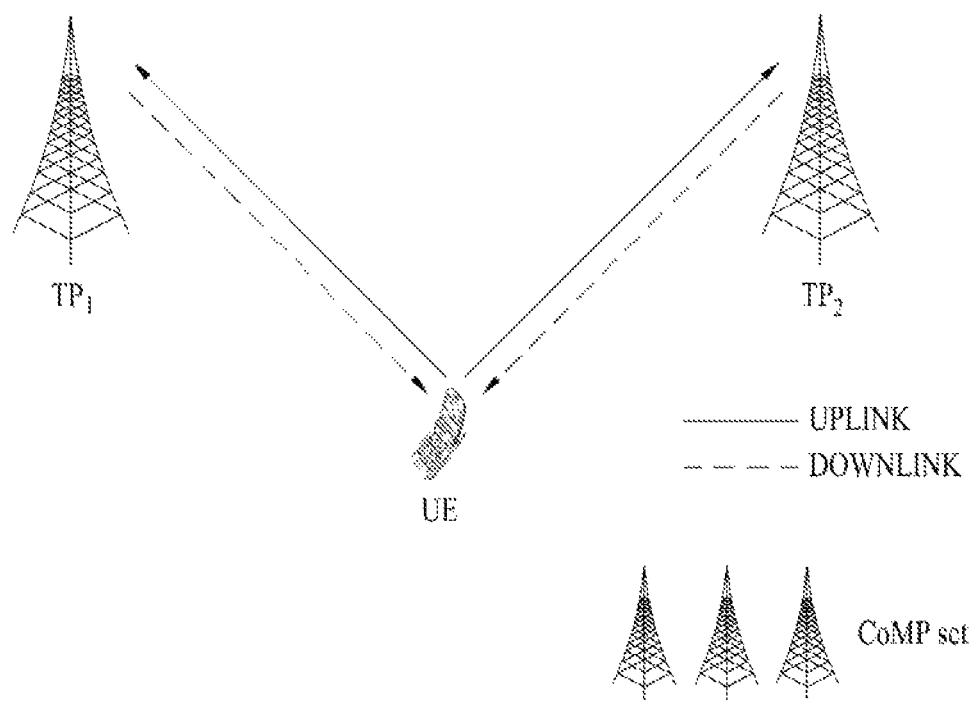
FIG. 8 is a diagram illustrating a multiple point transmission and reception operation.

FIG. 8 is a diagram illustrating a wireless communication system in which a UE is served with a joint transmission (JT) service from a CoMP set. That is, FIG. 8 illustrates an example in which the UE is configured in transmission mode 10.

In FIG. 8, the UE may receive data all transmission points (TPs) belonging to the CoMP set, for example, TP1 and TP2 and thus transmit channel state information about the all TPs belonging to the CoMP set. In this case, RSs may also be transmitted to the UE from a plurality of TPs in the CoMP set. In this case, when characteristics for channel estimation from different RS ports of different TPs can be shared, the load and complexity of receiving processing of the UE can be lowered. In addition, when characteristics for channel estimation from different RS ports of the same TP can be shared between RS ports, the load and complexity of receiving processing of the UE can be lowered. Accordingly, the current LTE(-A) system proposes a method for sharing characteristics for channel estimation between RS ports.

For channel estimation between RS ports, the LTE(-A) system introduces the concept of "quasi co-located (QCL)". For example, in the case of two antenna ports, when the large-scale property of a radio channel for transmitting one symbol through one antenna port can be inferred from a radio channel for transmitting one symbol through the other antenna, it can be said that the two antenna ports are quasi co-located. Here, the large-scale property includes one or more of delay spread, Doppler spread, Doppler shift, average gain, and average delay. Hereinafter, the quasi co-located will be simply referred to as QCL.

That is, when two antenna ports are QCL, it can be said that the large-scale property of a radio channel from one antenna port is the same as the large-scale property of a radio channel from the other antenna port. In consideration of a plurality of antenna ports for transmission of a reference signal (RS), when antenna ports for transmitting different types of RSs are QCL, the large-scale property of a radio channel from one type of antenna port can be replaced with the large-scale property of a radio channel from the other type of antenna port.

According to the concept of the QCL, for non-QCL antenna ports, the UE cannot assume the same large-scale property between radio channels from the corresponding antenna ports. That is, in this case, the UE needs to perform independent processing for each non-QCL antenna port configured for timing acquisition and tracking, frequency offset estimation and compensation, delay estimation and Doppler estimation, etc.

It is advantageous that the UE can perform the following operation between antenna ports that can be assumed to be QCL:

For delay spread and Doppler spread, the UE can also apply results of power-delay-profile, delay spread and Doppler spectrum, and Doppler spread estimation for a radio channel from any one of the antenna ports to a Wiener filter used in channel estimation for a radio channel from the other antenna port in the same way.

For frequency shift and reception timing, the UE can perform time and frequency synchronization on any one of the antenna ports and then apply the same synchronization to demodulation to the other antenna port.

For average reception power, the UE can average measurement of reference signal received power (RSRP) for two or more antenna ports.

Upon receiving specific DMRS-based DL-related DCI format through a control channel (PDCCH or ePDCCH), the UE performs channel estimation on the corresponding PDSCH through a DMRS sequence and then performs data demodulation. For example, when the UE can assume that antenna ports (hereinafter, referred to as a "DMRS port") for transmission of a DMRS from the DL scheduling grant is configured to be QCL with antenna ports (hereinafter, referred to as a "CRS port") for transmission of a CRS of a DL serving cell or another cell of the UE, the UE can apply an estimated value of the large-scale property of a radio channel estimated from the CRS port during channel estimation through the corresponding DMRS port without change so as to enhance the performance of a processor of a DMRS-based receiver.

As described above, this is because a CRS is an RS that is broadcast with a relatively high density at every subframe and over all bands, and thus an estimated value for the large-scale property can be stably acquired from the CRS in general. On the other hand, since a DMRS is UE-specifically transmitted for a specifically scheduled RB and a precoding matrix used for transmission in a PRG unit by an eNB can be changed, an effective channel received by a UE can be varied in a PRG unit, and thus even if a plurality of PRGs is scheduled, performance degradation may occur when the DMRS is used for estimation of the large-scale property of a radio channel over a wide band. Since the CSI-RS has a transmission period of several to several tens of ms and a low density of average of 1 RE (2RE as a reception unit when CDM is applied) for each antenna port per RB, performance degradation may also occur when the CSI-RS is used for estimation of the large-scale property of the radio channel.

That is, the QCL assumption between antenna ports can be used for channel state report, channel estimation, and reception of various downlink reference signals.

For a CoMP operation, when the UE is assigned a resource through DCI, the number of resource allocation regions may be two or more, which means that different resource allocation regions can be transmitted from at least two TPs and DL data can be transmitted to a CoMP UE from a TP with a good channel state. When this channel is divided into frequency bands, this operation may be referred to a frequency selective CoMP operation.

The present invention proposes a scheduling method for a corresponding resource allocation region during the frequency selective CoMP operation and thus a new DCI format is defined.

First Embodiment

An embodiment of the present invention proposes a method in which a UE is scheduled via frequency selective CoMP transmission (e.g. frequency selective DPS) by independently configuring whether a DMRS configuration (e.g. DMRS port(s), scrambling ID information such as nSCID value, and DMRS sequence scrambling seed value x(n)) and another RS (e.g. DL serving-cell CRS, specific neighboring-cell CRS, or other CSI-RSs of the UE) are QCL, for each respective specific RB(s) upon receiving DL related DMRS-based DCI through a PDCCH or an ePDCCH. Here, the DMRS configuration corresponds to, for example, information shown in the following table. In the following table, $n_{SCID}=0$ unless each value is clearly stated.

TABLE 9

| One Codeword:<br>Codeword 0 enabled,<br>Codeword 1 disabled | | Two Codewords:<br>Codeword 0 enabled,<br>Codeword 1 enabled | |
|---|---|---|---|
| Value | Message | Value | Message |
| 0 | 1 layer, port 7, $n_{SCID}=0$ | 0 | 2 layers, ports 7-8, $n_{SCID}=0$ |
| 1 | 1 layer, port 7, $n_{SCID}=1$ | 1 | 2 layers, ports 7-8, $n_{SCID}=1$ |
| 2 | 1 layer, port 8, $n_{SCID}=0$ | 2 | 3 layers, ports 7-9 |
| 3 | 1 layer, port 8, $n_{SCID}=1$ | 3 | 4 layers, ports 7-10 |
| 4 | 2 layers, ports 7-8 | 4 | 5 layers, ports 7-11 |
| 5 | 3 layers, ports 7-9 | 5 | 6 layers, ports 7-12 |
| 6 | 4 layers, ports 7-10 | 6 | 7 layers, ports 7-13 |
| 7 | Reserved | 7 | 8 layers, ports 7-14 |

In DCI format proposed according to an embodiment of the present invention, a plurality of resource allocation fields can be designated for one DCI format, and independent DMRS configurations and whether QCL with another RS is assumed can be separately designated for respective resource allocation fields. Fields in legacy DCI format, for example, an HARQ process number (or ID) (e.g., 4 bits), a TPC field (e.g. 2 bits), a periodic SRS triggering field (e.g. 0 or 1 bit), a CIF (3 bits) and a downlink assignment index (DAI) (e.g. 2 bits) in the case of carrier aggregation (CA) system, etc. can commonly carry information once for one DCI format, like in a conventional method. In addition, MCS(n), NDI(n), RV(n) (e.g. n=1, 2), etc. may also be present once or twice according to the number of data streams or codewords for one DCI format, like in the conventional method.

That is, according to an embodiment of the present invention, other fields in the DCI format other than parts for configuring a plurality of resource allocation and independent DMRS configurations associated for the respective resource allocations and/or whether QCL with another RS is assumed can be commonly present for all resource allocations or specifically present to each resource allocation as necessary.

As such, in terms of a higher layer, a data transmission and scheduling method that is not different from a conventional method based on the same HARQ process may selectively scheduled, and in terms of a physical layer, a transmission point with good performance in a unit of a specific RB group, a DMRS configuration, and whether QCL with another RS can be assumed may be selectively scheduled, thereby enhancing performance due to higher MCS configuration compared with the conventional method.

Figure 9:
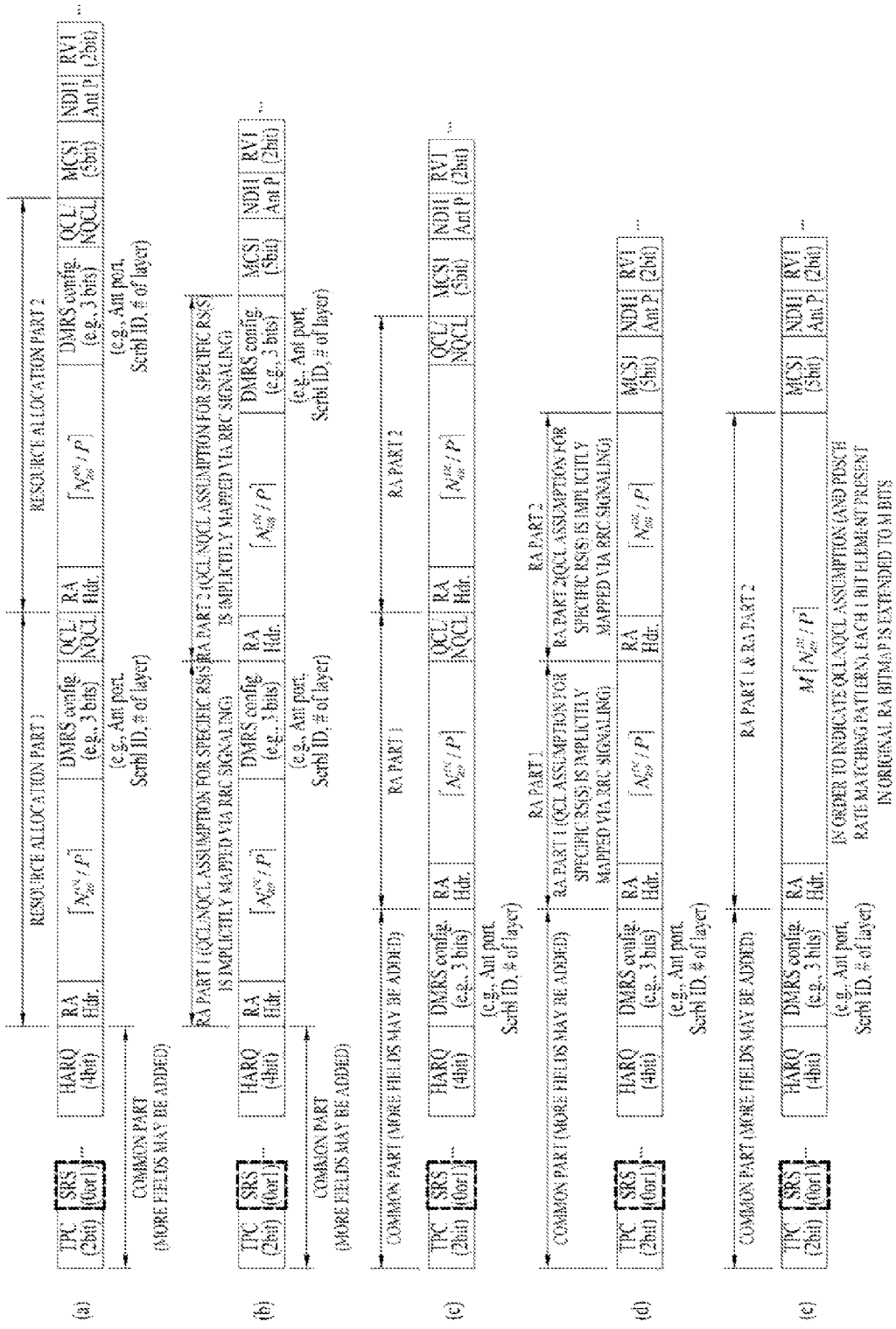
FIG. 9 is a diagram illustrating a configuration of downlink control information according to embodiment(s) of the present invention.

FIG. 9(a) illustrates an embodiment of the present invention. That is, fields present in a legacy specific DCI format may be present in a part indicated by "common part" without change. For example, the common part may include a transmit power control (TPC) field, an aperiodic SRS triggering field, a HARQ process ID field, and CIF and DAI fields in the case of CA system, etc. In the embodiment of FIG. 9(a), "resource allocation part 1" and "resource allocation part 2" are present, and all scheduled RB bands are divided into two parts and are used in a frequency selective CoMP transmission mode. However, the present invention is not limited to the number of resource allocation parts. That is, it may be possible to extend the present invention so as to divide the resource allocation part into three parts or more and to semi-statically (e.g., RRC signaling) or dynamically indicating the number of resource allocation parts.

Preferably, it may be preferable to determine the number of resource allocation parts by as much as a predefined number according to the frequency selective CoMP transmission mode in terms of blind decoding of the UE and the number of resource allocation parts may be semi-statically switched via UE-specific RRC signaling.

Figure 10:
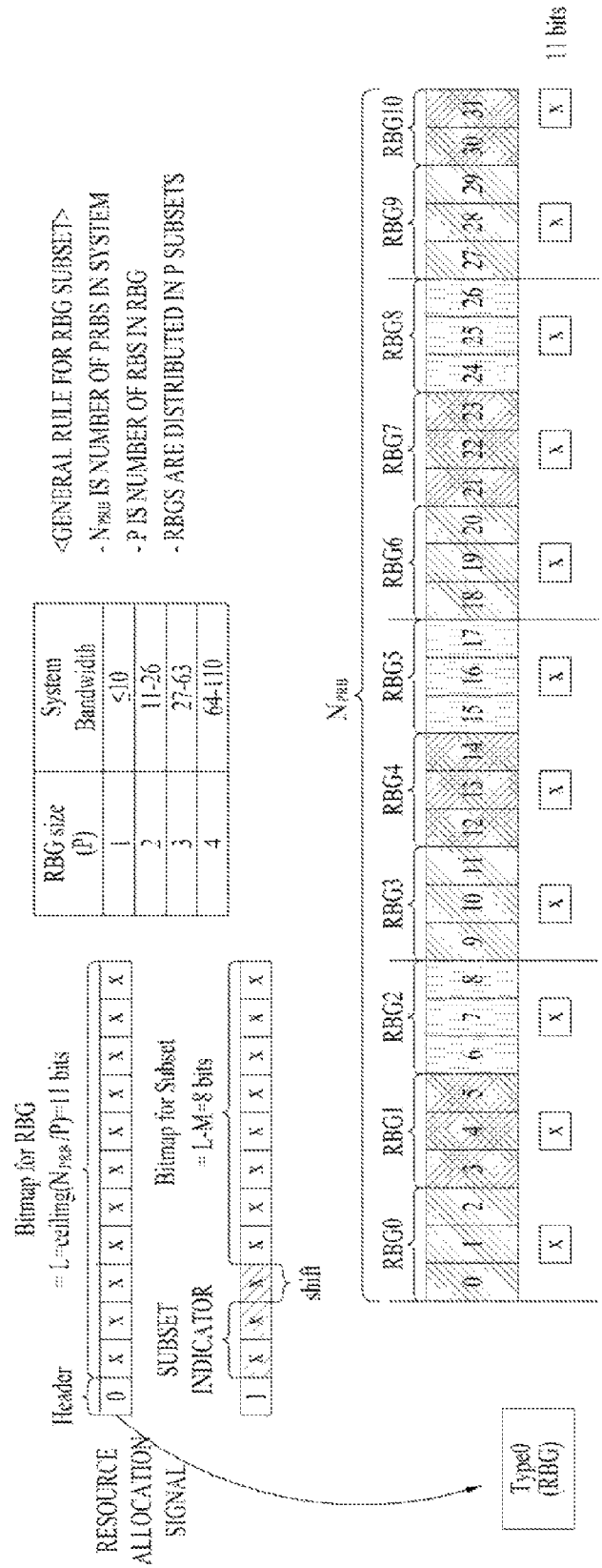
FIG. 10 is a diagram illustrating an example of resource allocation.

When a resource allocation part includes type 0 and type 1 of resource allocation (RA) fields, the types are differentiated by an RA header field 1 bit included in the RA part, and FIG. 9(a) illustrates that a bitmap using the legacy type 0 and type 1 of RA method described with reference to FIGS. 10 and 11 can be applied without change. In this manner, FIG. 9(a) illustrates that, with respect to one resource allocation part indicating specific RB(s) bundle, a field indicating a DMRS configuration (e.g., antenna port(s), scrambling ID, and the number of layers), which needs to be applied to be associated with the one resource allocation part, and whether QCL/NQCL with another RS can be assumed can be included in the DCI format. As such, it would be obvious that a field associated with a specific resource allocation part may be a part of the DMRS configuration field and QCL/NQCL field or the entire field may be associated with the DMRS configuration field and the QCL/NQCL field and may also be associated with other information.

Other resource allocation parts may associate and indicate independent RA information and DMRS configuration, and QCL/NQCL fields.

Among information associated for the respective RA parts, for example, a QCL/NQCL field may not be explicitly present and may be implicitly indicated by indicating QCL/NQCL information associated for the respective RA parts. For example, the implicit indication may be semi-statically performed via a higher layer signal such as RRC signaling. It is advantageous to save a bit width by omitting the QCL/NQCL field in the DCI format through the implicit indication. For example, implicit indication may be given for each RA part via RRC signaling as follows:

RA part 1: RA in which QCL between corresponding DMRS port(s) and DL serving-cell CRS port(s) can be assumed RA part 2: RA in which QCL between corresponding DMRS port(s) and DL serving-cell CRS port(s) cannot be assumed This example can be changed in various forms. For example, this information is given via RRC signaling such as indicating specific CSI-RS port(s) or other specific neighboring-cell CRS port(s) instead of "DL serving-cell CRS port(s)", implicit indication can be semi-statically given in various forms. In this case, the embodiment illustrated in FIG. 9(a) can be changed to an embodiment in which "QCL/NQCL field" is omitted and is implicitly mapped as illustrated in FIG. 9(b).

Like in the conventional method, MCS(n), NDI(n), and RV(n) (e.g. n=1, 2) may be present as n=1 or n=1,2 according to the number of data streams or the number of codewords.

FIGS. 9(a) to 9(e) illustrate the case in which type 0f of RA method is applied for convenience. However, it would be obvious to apply type 1 of RA method and compact type of RA method, i.e. type 2 of RA method. In addition, type 0/1 or type 2 can be interchangeably indicated for each resource allocation part in one DCI format.

According to the present invention, for convenience, legacy RA type 0/1 or type 2 is reused without change. However, an RA method can be newly designed and applied in an optimal form for the frequency selective CoMP operation.

In addition, in FIGS. 9(a) and 9(b), a DMRS configuration field (e.g. 3 bits) is not independently designated for each RA part, and a DMRS configuration field is included in a common part so as to associate common DMRS configuration for each RA part. This example is shown in FIGS. 9(c) and 9(d). That is, TPs that actually transmit a PDSCH may be different for respective RA parts, but DMRS configurations can be commonly applied.

Needless to say, as illustrated in FIGS. 9(a) and 9(b), when a DMRS configuration for each RA part can be independently configured, TPs that can actually transmit a PDSCH for each RA part can use different DMRS sequences, and accordingly, it is advantageous to achieve higher flexibility for DMRS sequence allocation while satisfying DMRS sequence orthogonality with other UEs that are served with the same RB(s) in a corresponding TP, but it is disadvantageous to independently allocate a DMRS configuration of a specific bit width for each RA part to increase overhead of DCI format. Thus, the DMRS configuration in the form illustrated in FIGS. 9(c) and 9(d) may be commonly applied to each RA part, thereby reducing overhead.

An embodiment of FIG. 9(d) may be changed to change DCI format as illustrated in FIG. 9(e). Referring to FIG. 9(e), bitmaps are not separately allocated to respective RA parts and are indicated by one RA bitmap, and 1-bit elements in a legacy RA bitmap can each be extended to M bit(s) so as to dynamically indicate one state among $2^M$ states (which are pre-configured via RRC). That is, when M=2, total of $2^M$=4 states of '00', '01', '10', and '11' can each be replaced by 1-bit element information in the legacy RA bitmap like in FIGS. 10 and 11. In this regard, M-bit information that can replace 1-bit element information in the legacy RA bitmap may be pre-configured via RRC signaling in the following form:

State '00': Resource allocation is not performed.

State '01': Resource allocation is performed and QCL between corresponding DMRS port(s) and DL serving-cell CRS port(s) can be assumed.

State '10': Resource allocation is performed and QCL between corresponding DMRS port(s) and other specifically designated CRS port(s) can be assumed.

State '11': Resource allocation is performed and QCL with any CRS port(s) cannot be assumed (NQC).

That is, a method for interpreting each state may be pre-defined via RRC signaling and may be semi-statically switched. For example, in the above description of the four states, the "DL serving-cell CRS port(s)" may be replaced with "other specific neighboring-cell CRS port(s)" or the "specific CRS port(s)" may be replaced with "specific CSI-RS port(s)", and likewise, information may be given via RRC signaling and thus implicit indication may be semi-statically given in various forms.

Second Embodiment

According to another embodiment of the present invention, whether QCL between specific CRS port(s) and DMRS port(s) indicated by DMRS configurations associated for the respective RA parts can be assumed may be indicated by a QCL/NQCL field. For example, a UE including an interference cancellation receiver embodied therein can have capability for continuously tracking large-scale property such as time/frequency synchronization, delay spread, Doppler spread, frequency shift, reception timing, etc. for CRS port(s) as well as DL serving-cell CRS port(s) of the UE, and reception processing performance of the UE can be enhanced by indicating CRS port(s) of a corresponding TP, which can be assumed to be QCL with corresponding DMRS port(s) associated for the respective RA parts so as to share a specific estimated value according to the large-scale property between port(s) that can be assumed to be QCL in the case of a frequency selective DPS method for transmission for respective RA parts by different TPs for enhancing the receiver processing performance of the UE.

In the above embodiment, the "specific CRS port(s)" may be replaced with "specific CSI-RS port(s)" without change. That is, like in the CoMP scenario 4, when CRS port(s) are shared between TPs, if capability for estimation of the large-scale property of CSI-RS port(s) is sufficient by associating and indicating specific CSI-RS port(s) that can be assumed to be QCL with specific DMRS port(s), reception processing performance can also be enhanced through a QCL/NQCL field between specific CSI-RS port(s) and DMRS port(s) for the respective RA parts.

Third Embodiment

Figure 12:
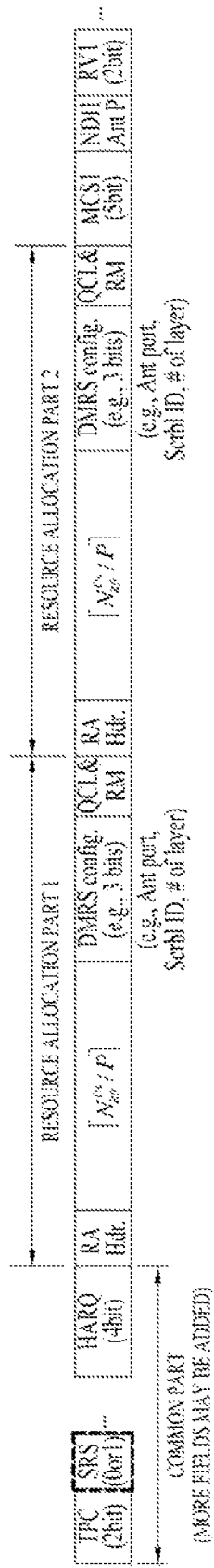
FIG. 12 is a diagram illustrating a configuration of downlink control information according to embodiment(s) of the present invention.

According to another embodiment of the present invention, a DMRS configuration and QCL/NQCL field may be dynamically indicated in association with resource mapping information of a downlink data channel (e.g. a PDSCH), that is, CRS rate matching (RM) pattern indication information obtained by considering a specific CRS that can be assumed to be QCL. FIG. 12 is a diagram illustrating an example in which a QCL/NQCL field and a field for CRS RM pattern indication are associated. FIG. 12 illustrates the example obtained by replacing the "QCL/NQCL" field of FIG. 9(a) with a "QCL & RM" field. The "QCL & RM" field of FIG. 12 is used to transmit indication of a PDSCH rate matching operation that considers corresponding CRS port(s) as well as to indicate whether QCL between specific CRS port(s) and DMRS port(s) associated for the corresponding RA part can be assumed.

That is, it may be promised that, when a specific RA part corresponds to PDSCH transmission from a specific cell B (or TP B), CRS REs of TP B are rate matched, or when PDSCH RE mapping that considers only a CRS position of TP B or PDSCH transmission from TP B is dynamically indicated, indication "QCL between corresponding DMRS port(s) and CRS port(s) of TP B can be assumed" is always implicit in indication for CRS RM. By applying this implicit interpretation, only the dynamic indication field (e.g. "QCL & RM field" of FIG. 12) associated with CRS RM may be added to the DCI format without adding both a dynamic indication field associated with CRS RM and the QCL/NQCL field of FIG. 9(a) to the DCI format, and the implicit interpretation that QCL between CRS port(s) and corresponding DMRS port(s) of a TP to which CRS REs indicated by the dynamic indication field are rate matched is automatically assumed may be applied, thereby saving a dynamic signaling bit width.

As illustrated in FIGS. 9(b), 9(d), and 9(e), it would be obvious that the CRS RM related information is also associated together in embodiments in which QCL/NQCL information associated for each RA part is semi-statically and implicitly pre-indicated via a higher layer signal such as RRC signaling. That is, implicit indication for a PDSCH rate matching operation that considers corresponding CRS port(s) as well as indication about whether QCL between specific CRS port(s) and DMRS port(s) associated with a corresponding RA part for the respective RA parts is assumed may be pre-configured via RRC signaling, and when a specific RA part is indicated, the information may be implicitly indicated together.

That is, in the embodiments illustrated in FIGS. 9(b) and 9(d), information that is implicitly mapped for each respective RA part is in the form "RA part k: PDSCH rate matching patter and QCL/NQCL assumption with specific RS(s) are implicitly mapped via RRC signaling", and when a $k^{th}$ RA part is indicated, whether QCL with specific RS port(s) to be automatically applied to the corresponding RA part k is assumed and an RM pattern applying method may be semi-statically configured via RRC signaling.

Like in FIG. 9(e), in the method in which bitmaps are not separately allocated to respective RA parts and are indicated by one RA bitmap, and 1-bit elements in a legacy RA bitmap can each be extended to M bit(s) so as to dynamically indicate one state among $2^M$ states which are pre-configured via RRC, an RM pattern applying method as well as whether QCL with specific RS port(s) is assumed may be semi-statically configured via RRC signaling for the description of each state.

Like in FIG. 9(c), in the embodiment in which a DMRS configuration field (e.g. 3 bits) is allocated to a common part and QCL/NQCL information and specific RS port(s) for the respective RA parts are explicitly indicated, the "QCL/NQCL" field may be extended to and replaced with the "QCL & RM" field as described above. That is, in this case, the DMRS configuration may be commonly applied to all RA parts, and indication about a PDSCH rate matching operation that considers corresponding CRS port(s) as well as indication about whether QCL between specific CRS port(s) and corresponding DMRS port(s) for each RA part may be transmitted together.

Fourth Embodiment

The aforementioned method for associating CRS RS indication and whether QCL/NQCL is assumed with one field can also be applied to the legacy DCI format in which only one RA part is present in one DCI format. That is, it would be obvious that the aforementioned indication about CRS RM and whether QCL/NQCL is assumed may also be applied to the conventional method for applying one DMRS configuration to all generally scheduled RBs, but not to the frequency selective CoMP method for applying different DMRS configuration for the respective RA parts.

It may be promised that, for scheduled RB(s) indicated in a specific DCI format, when CRS REs of TP B are rate matched or dynamic indication indicating PDSCH RE mapping that considers only a CRS position of TP B or PDSCH transmission from TP B is given in the corresponding DCI format, indication "QCL between DMRS port(s) indicated by corresponding DCI format and CRS port(s) of TP B can be assumed" is always implicit in indication for CRS RM.

Fifth Embodiment

Another embodiment of the present invention proposes a method for associating the aforementioned information indicating whether QCL/NQCL is assumed or CRS RM related information is associated with $n_{SCID}$ in the DCI format. When a DMRS configuration included in specific DMRS-based DL-related DCI format (e.g. DCI format 2C) can be dynamically indicated in state(s) such as $n_{SCID}$=0, $n_{SCID}$=1, or the like, a system or an eNB may pre-provide information for implicitly mapping information about whether QCL/NQCL between corresponding DMRS port(s) and specific RS port(s) is assumed and PDSCH rate matching pattern information (e.g. CRS v-shift, port number, and a set of subframes to which the rate matching is applied) of specific RS (e.g. CRS of TP or specific cell) to $n_{SCID}$=0 and $n_{SCID}$=1, respectively, via RRC signaling, and upon receiving the DCI format through a PDCCH or ePDCCH of a UE, the UE may apply the information pre-configured via RRC according to corresponding $n_{SCID}$ to receiver processing.

In more detail, the information that can be implicitly mapped to $n_{SCID}$ (e.g. 0 or 1) is listed as follows and at least one of the information may be implicitly mapped.

- Seed value of DMRS sequence x(n), n=0, 1 (virtual cell-ID concept)
- Corresponding DMRS port(s) and specific RS port(s) (e.g. DL serving-cell CRS port(s) or other specific CRS port(s) or whether specific CSI-RS port(s) is QCL/NQCL)
- In association with rate matching patter information of corresponding scheduled PDSCH, specific CRS port number, CRS v-shift, set of subframes to which the rate matching pattern is applied, etc.

As another approach method, in order to support (F)eICIC technology, etc., when information (hereinafter, referred to as "neighboring-cell list") about physical cell-ID(PCID), corresponding CRS port number, CRS v-shift (PCID mod N, e.g. N=6, etc. may be given), and a set of subframes to which the rate matching for adjacent specific neighboring-cells as well as a serving-cell of a UE are allocated to the UE, if a specific DMRS sequence seed value x(n) (e.g. n=0,1) associated with the specific $n_{SCID}$ is equal to a specific PCID in the neighboring-cell list, information about the CRS port number associated with the PCID, CRS v-shift (PCID mod N, e.g. N=6), and a set of subframes to which the rate matching pattern is applied can be applied as (CRS related) rate matching pattern information of a corresponding scheduled PDSCH.

That is, upon being scheduled a specific PDSCH, the UE may check whether a specific value x(n) associated with $n_{SCID}$ of DMRS belonging to corresponding DL-related DCI is equal to a specific PCID of a neighboring-cell list of the UE. In this case, when the corresponding value x(n) is equal to the specific PCID, information about the CRS port number associated with the corresponding PCID, CRS v-shift (PCID mod N, e.g. N=6), and a set of subframes to which the rate matching pattern is applied may be associated together so as to be applied as (CRS related) rate matching pattern information of the corresponding scheduled PDSCH.

For each OFDM symbol indicated by a parameter for downlink power allocation, $\rho_A$ or $\rho_B$, parameters $P_A$ and $P_B$ used to signal UE-specific RRC used to calculate a ratio of cell-specific RS EPRE to PDSCH EPRE (that is not applied to PDSCH REs of zero EPRE) among PDSCH REs A more detailed example is as follows.

Example 1

In the Case of CoMP DPS

Information that is Implicitly Mapped to $n_{SCID}$=0:
x(0)
QCL between corresponding DMRS port(s) and DL serving-cell (cell A) CRS port(s) can be assumed.
In association with PDSCH RM, CRS port number=4, CRS v-shift=0, and each even subframe to which the RM pattern is applied.
specific $P_A$ and $P_B$
Information that is Implicitly Mapped to $n_{SCID}$=1:
x(1)
QCL between corresponding DMRS port(s) and CRS port(s) of cell B can be assumed.
In association with PDSCH RM pattern, CRS port number=2, CRS v-shift=3, and each odd subframe to which the RM patter is applied.
specific $P_A'$ and $P_B'$ In Example 1, for DPS between cell A and cell B, RRC signaling that is implicitly mapped to each $n_{SCID}$ is given. Another embodiment will now be described.

Example 2

In the Case of CoMP JT

Information that is Implicitly Mapped to $n_{SCID}$=0:
x(0)
QCL between corresponding DMRS port(s) and DL serving-cell (cell A) CRS port(s) can be assumed
In association with PDSCH RM pattern, CRS port number=4, CRS v-shift=0, and each even frame to which the RM pattern is applied
specific $P_A$ and $P_B$
Information that is Implicitly Mapped to $n_{SCID}$=1:
x(2); which may be a third scrambling seed value (e.g., for CoMP JT)
there is no CRS port(s) that can be assumed to be QCL with corresponding DMRS port(s) (i.e. NQCL needs to be assumed)
In association with PDSCH RM pattern,
in consideration of CRS port number=2, CRS v-shift=3, and each odd subframe, to which rate matching pattern is applied, of cell B as well as CRS port number=4, CRS v-shift=0, and each even subframe of cell A, the PDSCH RM pattern is configured to rate match RE positions of CRS port(s) of present cells A and B.
specific $P_A'$ and $P_B'$ In [Example 2], RRC signaling for implicitly mapping to $n_{SCID}$ may be given so as to schedule $n_{SCID}$=1 during scheduling of CoMP JT from cells A and B and to schedule $n_{SCID}$=0 during scheduling (which can be interpreted as a kind of fallback operation) of only single cell transmission from cell A as DL serving-cell according to a situation.

As such, in overall consideration of a channel environment of the UE, a load situation between cells, UE mobility, etc., an eNB may semi-statically transmit RRC signaling for implicitly mapping a combination of information in the form in [Example 1] and [Example 2], and thus a CoMP transmission method that appropriately use a semi-static configuration of specific transmission methods and dynamic indication using $n_{SCID}$ in the semi-static configuration via a limited DMRS configuration method using 1 bit of $n_{SCID}$.

Sixth Embodiment

Upon receiving DL scheduling grant through one specific DMRS-based DCI, a UE may be operated so as to semi-statically receive information about whether QCL or NQCL between two or more DMRS ports can be assumed and to reflect the information to receiver processing when two DMRS ports or more are present.

For example, upon being scheduled with a PDSCH when two ranks or more are present, the UE can apply a UE behavior that NQCL needs to be assumed for all (or specific) scheduled PRG(s) between corresponding two DMRS ports or more.

As an example of assuming NQCL between DMRS ports, a PDSCH is transmitted in the form of join transmission (JT) between adjacent TPs, and specific DMRS port(s) may be transmitted by one TP and the remaining DMRS port(s) may be transmitted by another TP. In this case, the corresponding UE needs to assume NQCL between DMRS ports.

In addition, when NQCL between DMRS ports is assumed only for the specific scheduled PRG(s), this means that a frequency selective CoMP operation (e.g. DPS/JT, etc.) is applied, and different CoMP methods (e.g. DPS/JT, etc.) may be applied for respective PRG-levels. As such, PRG-unit dynamic indication about PRG(s) to which QCL/NQCL assumption between DMRS ports or between corresponding DMRS port(s) and other RS (e.g. specific CRS port(s) or specific CSI-RS port(s)) is applied or semi-static indication such as RRC signaling may be transmitted to the UE.

Figure 13:
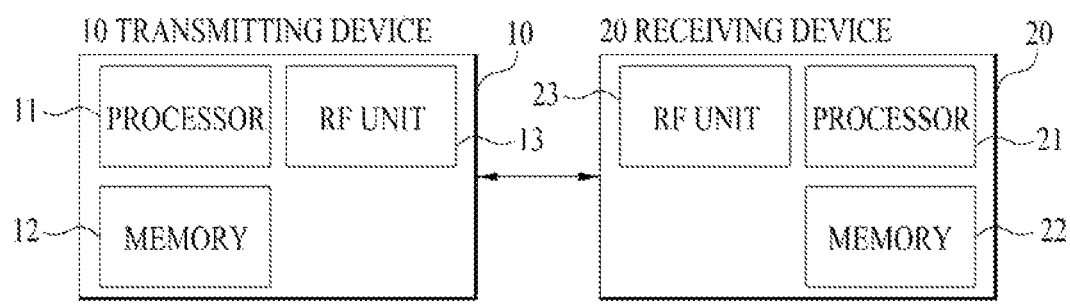
FIG. 13 is a block diagram of an apparatus for embodying embodiment(s) of the present invention.

FIG. 13 is a block diagram showing components of a transmitting device 10 and a receiving device 20 for performing the embodiments of the present invention. The transmitting device 10 and the receiving device 20 include radio frequency (RF) units 13 and 23 for transmitting or receiving a radio signal carrying information and/or data, a signal and a message, memories 12 and 22 for storing a variety of information associated with communication in a wireless communication system, and processors 11 and 21 connected to the components including the RF units 13 and 23 and the memories 12 and 22 and configured to control the memories 12 and 22 and/or the RF units 13 and 23 to perform at least one of the embodiments of the present invention, respectively.

The memories 12 and 22 may store programs for processing and controlling the processors 11 and 21 and may temporarily store input/output signals. The memories 12 and 22 may be used as a buffer. The processors 11 and 21 generally control the overall operation of the various modules of the transmitting device and the receiving device. In particular, the processors 11 and 21 may perform a variety of control functions for performing the present invention. The processors 11 and 21 may be referred to as a controller, a microcontroller, a microprocessor, a microcomputer, etc. The processors 11 and 21 can be implemented by a variety of means, for example, hardware, firmware, software, or a combination thereof. In the case of implementing the present invention by hardware, application specific integrated circuits (ASICs), digital signal processors (DSPs), digital signal processing devices (DSPDs), programmable logic devices (PLDs), field programmable gate arrays (FPGAs), etc. configured to perform the present invention may be included in the processors 11 and 21. If operations or functions of the present invention are implemented by firmware or software, firmware or software may be configured to include modules, procedures, functions, etc. for performing the functions or operations of the present invention. The firmware or software configured to perform the present invention may be included in the processors 11 and 21 or stored in the memories 12 and 22 so as to be operated by the processors 11 and 21.

The processor 11 of the transmitting device 10 performs coding and modulation with respect to a signal and/or data which is scheduled by the processor 11 or a scheduler connected to the processor 11 to be transmitted to an external device and transmits the signal and/or data to the RF unit 13. For example, the processor 11 transforms a data stream to be transmitted into K layers via demultiplexing and channel coding, scrambling, modulation, etc. The coded data stream is also called a codeword and is equivalent to a transport block which is a data block provided by a medium access control (MAC) layer. One transport block (TB) is encoded into one codeword and each codeword is transmitted to the receiving device in the form of one or more layers. For frequency up-conversion, the RF unit 13 may include an oscillator. The RF unit 13 may include Nt (Nt being a positive integer) transmit antennas.

Signal processing of the receiving device 20 is the inverse of signal processing of the transmitting device 10. Under control the processor 21, the RF unit 23 of the receiving device 20 receives a radio signal transmitted by the transmitting device 10. The RF unit 23 may include Nr (Nr being a positive integer) receive antennas and the RF unit 23 performs frequency down-conversion with respect to each signal received via each receive antenna and restores a baseband signal. The RF unit 23 may include an oscillator for frequency down-conversion. The processor 21 may perform decoding and demodulation with respect to the radio signal received via the receive antennas and restore original data transmitted by the transmitting device 10.

The RF units 13 and 23 include one or more antennas. The antennas serve to transmit the signals processed by the RF units 13 and 23 to external devices or to receive radio signals from external devices and to send the radio signals to the RF units 13 and 23 under control of the processors 11 and 21 according to one embodiment of the present invention. The antennas are also called antenna ports. Each antenna may be composed of one physical antenna or a combination of more than one physical antenna elements. The signal transmitted by each antenna is not decomposed by the receiving device 20. A reference signal (RS) transmitted in correspondence with the antenna defines the antenna viewed from the viewpoint of the receiving device 20 and enables the receiving device 20 to perform channel estimation of the antenna regardless of whether the channel is a single radio channel from a single physical antenna or a composite channel from a plurality of physical antenna elements including the above antennas. That is, the antenna is defined such that the channel for delivering a symbol over the antenna is derived from the channel for delivering another symbol over the same antenna. In case of the RF unit supporting a multiple input multiple output (MIMO) function for transmitting and receiving data using a plurality of antennas, two or more antennas may be connected.

In the embodiments of the present invention, a UE operates as the transmitting device 10 in uplink and operates as the receiving device 20 in downlink. In the embodiments of the present invention, an eNB operates as the receiving device 20 in uplink and operates as the transmitting device 10 in downlink.

The transmitting device 10 and/or the receiving device 20 may perform a combination of at least one or two embodiments among the above-described embodiments of the present invention.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The present invention may be used for a wireless communication apparatus such as a user equipment (UE), a relay and a base station (BS).

The invention claimed is:

1. A method for receiving downlink signal in a wireless communication system for supporting coordinated multiple-point transmission and reception (CoMP), the method comprising:
   receiving, by a user equipment (UE), downlink control information comprising a plurality of resource allocation parts of downlink data channel from a base station (BS);
   acquiring, by the UE, information on whether or not quasi co-located (QCL) assumption between antenna port(s) of a specific reference signal and antenna port(s) of demodulation reference signals associated with each of the plurality of resource allocation parts is applied; and
   demodulating, by the UE, the downlink data channel using the acquired information.

2. The method according to claim 1, wherein whether or not the QCL assumption is applied is indicated dynamically through a specific field of each of the plurality of resource allocation parts or semi-statically via higher layer signaling.

3. The method according to claim 1, wherein each of the plurality of resource allocation parts comprises demodulation reference signal configuration information comprising information about antenna port(s), a scrambling identifier and the number of layers for a corresponding demodulation reference signal.

4. The method according to claim 1, wherein the downlink control information comprises demodulation reference signal configuration information comprising information about antenna port(s), a scrambling identifier and the number of layers for a demodulation reference signal shared by the plurality of resource allocation parts.

5. The method according to claim 1, wherein resources scheduled by the plurality of resource allocation parts are transmitted by at least two BSs.

6. The method according to claim 1, further comprising:
acquiring, by the UE, information about resource mapping of a downlink data channel with consideration for antenna port(s) of the specific reference signal to which the QCL assumption is applied.

7. The method according to claim 6, wherein the information about resource mapping of the downlink data channel is indicated in association with the information on whether or not the QCL assumption is applied.

8. A method for transmitting a downlink signal in a wireless communication system for supporting coordinated multiple-point transmission and reception (CoMP), the method comprising:
transmitting, by a base station (BS), downlink control information comprising a plurality of resource allocation parts of downlink data channel to a user equipment (UE), and
transmitting, by the BS, information on whether or not quasi co-located (QCL) assumption between antenna port(s) of a specific reference signal and antenna port(s) of demodulation reference signals associated with each of the plurality of resource allocation parts is applied,
wherein the downlink data channel is demodulated by the UE using the acquired information.

9. The method according to claim 8, wherein whether or not the QCL assumption is applied is indicated through a specific field of each of the plurality of resource allocation parts or semi-statically via higher layer signaling.

10. The method according to claim 8, wherein each of the plurality of resource allocation parts comprises demodulation reference signal configuration information comprising information about antenna port(s), a scrambling identifier and the number of layers for a corresponding demodulation reference signal.

11. The method according to claim 8, wherein the downlink control information comprises demodulation reference signal configuration information comprising information about antenna port(s), a scrambling identifier and the number of layers for a demodulation reference signal shared by the plurality of resource allocation parts.

12. The method according to claim 8, wherein resources scheduled by the plurality of resource allocation parts are transmitted by at least two BSs.

13. The method according to claim 8, further comprising transmitting information about resource mapping of a downlink data channel with consideration for antenna port(s) of the specific reference signal to which the QCL assumption is applied.

14. The method according to claim 13, wherein the information about resource mapping of the downlink data channel is indicated in association with the information on whether or not the QCL is applied.

15. A user equipment (UE) configured to receive downlink signal in a wireless communication system for supporting coordinated multiple-point transmission and reception (CoMP), the UE comprising:
a radio frequency (RF) unit; and
a processor configured to control the RF unit,
wherein the processor is configured to receive downlink control information comprising a plurality of resource allocation parts of downlink data channel from a base station (BS), to acquire information on whether or not quasi co-located (QCL) assumption between antenna port(s) of a specific reference signal and antenna port(s) of demodulation reference signals associated with each of the plurality of resource allocation parts is applied, and to demodulate the downlink data channel using the acquired information.

16. A base station (BS) configured to receive a downlink signal in a wireless communication system for supporting coordinated multiple-point transmission and reception (CoMP), the BS comprising:
a radio frequency (RF) unit; and
a processor configured to control the RF unit,
wherein the processor is configured to transmit downlink control information comprising a plurality of resource allocation parts of downlink data channel to a user equipment (UE), and to transmit information on whether or not quasi co-located (QCL) assumption between antenna port(s) of a specific reference signal and antenna port(s) of demodulation reference signals associated with each of the plurality of resource allocation parts is applied,
wherein the downlink data channel is demodulated by the UE using the acquired information.

* * * * *